(12) United States Patent
Matsumoto

(10) Patent No.: US 6,333,998 B1
(45) Date of Patent: Dec. 25, 2001

(54) IMAGE PROCESSING METHOD AND APPARATUS

(75) Inventor: Atsushi Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/146,962

(22) Filed: Sep. 4, 1998

(30) Foreign Application Priority Data

Sep. 8, 1997 (JP) .................................................. 9-243128

(51) Int. Cl.$^7$ ........................................................ G06K 9/64
(52) U.S. Cl. ............................................................ 382/217
(58) Field of Search .................................... 382/217, 218, 382/219, 220, 221, 216, 227, 228, 229, 270, 275, 266, 267, 268; 358/455, 456, 457, 458

(56) References Cited

U.S. PATENT DOCUMENTS

| | | | |
|---|---|---|---|
| 5,195,174 | * 3/1993 | Kagawa ................................. | 395/102 |
| 5,282,059 | * 1/1994 | Fukushima et al. .................. | 358/456 |
| 5,381,552 | 1/1995 | Dahlberg et al. ..................... | 395/725 |
| 5,465,157 | 11/1995 | Seto et al. ............................ | 358/298 |
| 5,586,227 | 12/1996 | Kawana et al. ...................... | 395/112 |
| 5,652,660 | 7/1997 | Seto et al. ............................ | 358/300 |
| 5,742,317 | 4/1998 | Kashihara ............................ | 347/131 |
| 5,754,188 | 5/1998 | Seto et al. ............................ | 345/472 |
| 5,828,396 | 10/1998 | Seto et al. ............................ | 347/111 |
| 5,854,689 | 12/1998 | Saito .................................... | 358/298 |
| 5,982,508 | * 11/1999 | Kashihara ............................ | 358/456 |
| 6,108,105 | 8/2000 | Takeuchi et al. .................... | 358/455 |
| 6,134,025 | 10/2000 | Takeuchi et al. .................... | 358/456 |

* cited by examiner

Primary Examiner—Andrew W. Johns
Assistant Examiner—Seyed Azarian
(74) Attorney, Agent, or Firm—Fitzpatrick, Cella, Harper & Scinto

(57) ABSTRACT

Disclosed are an image processing method and apparatus capable of improving character quality by applying smoothing processing even in a case where a faint character image is binarized. A multilevel digital image signal from an image input unit is binarized by a binarizing processor and the resulting bilevel image signal is delayed by a delay circuit for as long as required for pattern matching. Using the bilevel image signal from the delay circuit and the latest bilevel image signal, and in accordance with the predetermined size of a matrix for pattern matching, a pattern matching unit performs pattern matching between the bilevel image signal and all reference patterns stored in a ROM. If a match between the bilevel image and one reference pattern is obtained by pattern matching processing, a pixel substitution processor goes to the ROM to read out a pixel substitution pattern that corresponds to the reference pattern for which the match was obtained and outputs this pixel substitution pattern to an image signal output unit. If a line image in the bilevel image has been rendered discontinuous by an amount equivalent to one or more pixels owing to binarization, the pixel substitution pattern that has been read out and output will make the line continuous to improve the quality of a character image.

31 Claims, 24 Drawing Sheets

FIG. 4A
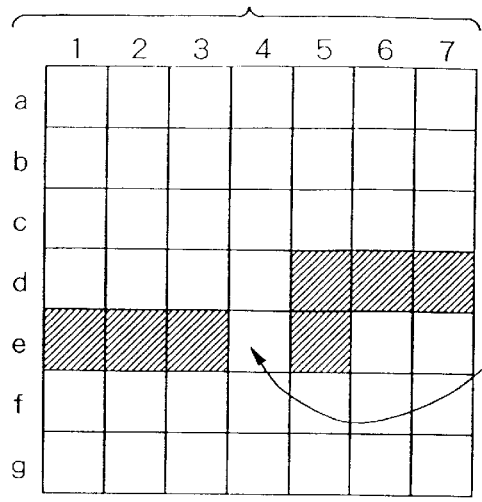
INPUT BILEVEL IMAGE
PATTERN MATCHING
SUBSTITUTION
FIG. 4B
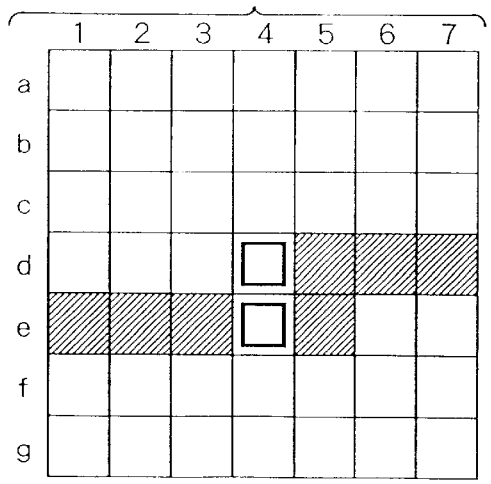
REFERENCE PATTERN
FIG. 4F
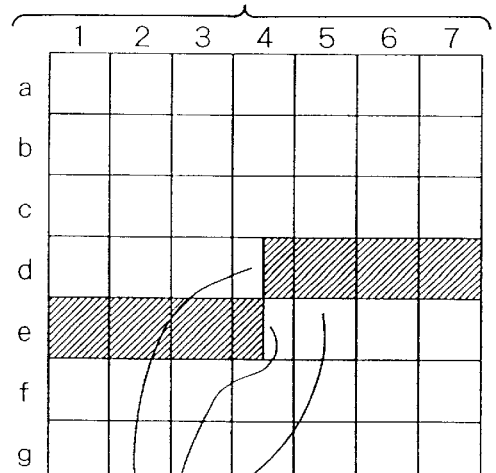
SUBSTITUTED PIXELS
OUTPUT IMAGE
FIG. 4C  FIG. 4D  FIG. 4E
  
PIXEL SUBSTITUTION PATTERNS

IMAGE PROCESSING METHOD AND APPARATUS

BACKGROUND OF THE INVENTION

This invention relates to an image processing method and apparatus. More particularly, the invention relates to an image processing method and apparatus applicable to a copier or printer, for example, wherein it is possible to output an image having a resolution higher than that of an input image in at least one direction.

A problem encountered with conventional printers and the like is the occurrence of conspicuous jaggies along the contours of font character images input to the printer. The reason for this is that since a character image is composed of black and white levels, even fine characters exhibit noticeable jaggies owing to contrast.

Processing referred to as "smoothing" generally is used to solve this problem. In a laser printer, such processing makes use of the fact that individual pixels forming the character image can be subdivided into a plurality of fine pixels in the scanning direction of the laser beam and involves detecting a specific pattern that appears on the contour of a character and replacing the specific pattern with fine pixels in the scanning direction, thereby reproducing the character contour smoothly.

However, smoothing is processing premised on bilevel font character images that are stored by computer or calculated and generated by computer. Consequently, when smoothing processing is applied to an image obtained by binarizing, through pseudo-halftone processing such as the error diffusion method, a multilevel gradation image optically read by a scanner or the like, unnatural jaggies occur at the contour of a character in order to express halftones at the boundary between black and white on the character contour. As a result, the contour does not match the pattern that should be obtained with smoothing processing and almost no smoothing is achieved.

A particular problem arises with an image obtained by binarizing a faint character image. Portions of such an image that should be straight lines become broken up or discontinuous, giving rise to a marked decline in character quality. Since such portions do not undergo smoothing, applying smoothing processing does not improve character quality.

SUMMARY OF THE INVENTION

Accordingly, an object of the present invention is to make possible the excellent reproduction of images free of broken lines by preserving the fine lines of characters binarized by pseudo-halftone processing such as error diffusion.

According to the present invention, the foregoing object is attained by providing an image processing apparatus comprising input means for inputting a multilevel digital image signal; binarizing means for converting the multilevel digital image signal input from the input means to a bilevel image of black pixels or white pixels; image storage means for storing the bilevel image; pattern storage means for storing predetermined reference patterns and pixel substitution patterns corresponding to the reference patterns; pattern matching means for comparing a bilevel image read out of the image storage means and reference patterns read out of the pattern storage means; and pixel substitution means which, if the result of the comparison performed by the pattern matching means indicates that the bilevel image matches a reference pattern, outputs a pixel substitution pattern, which corresponds to the reference pattern, that is composed of pixels finer, in at least one direction, than the pixels of the bilevel image, and which, if the result of the comparison performed by the pattern matching means indicates that there is no reference pattern that matches the bilevel image, outputs the bilevel image as is.

According to another aspect of the present invention, the foregoing object is attained by providing an image processing apparatus comprising reading means for optically reading an image and outputting a multilevel digital image signal; binarizing means for converting the multilevel digital image signal from the reading means to a bilevel image of black pixels or white pixels; image storage means for storing the bilevel image; pattern storage means for storing predetermined reference patterns and pixel substitution patterns corresponding to the reference patterns; pattern matching means for comparing a bilevel image read out of the image storage means and reference patterns read out of the pattern storage means; and pixel substitution means which, if the result of the comparison performed by the pattern matching means indicates that the bilevel image matches a reference pattern, outputs a pixel substitution pattern, which corresponds to the reference pattern, that is composed of pixels finer, in at least one direction, than the pixels of the bilevel image, and which, if the result of the comparison performed by the pattern matching means indicates that there is no reference pattern that matches the bilevel image, outputs the bilevel image as is.

By way of example, a pixel substitution pattern, which has been stored in the pattern storage means, that is output by the pixel substitution means is such a substitution pattern that connects a discontinuous line in a case where a line image contained in a bilevel image has been rendered discontinuous by one or more pixels as the result of binarization of the image by the binarizing means.

Further, by way of example, the pattern storage means stores, as the reference patterns, a plurality of reference patterns having different pixels of interest together with reference patterns having exactly the same position on the bilevel image.

Further, by way of example, a plurality of reference patterns having different pixels of interest and a plurality of pixel substitution patterns corresponding to these reference patterns, which are stored in the pattern storage means, are so adapted that the sum total of signal values of an original pattern is not changed.

Further, by way of example, a plurality of reference patterns, which are located at exactly the same position on the image, that have different pixels of interest while pattern matching processing is being performed and a plurality of pixel substitution patterns corresponding to these reference patterns, which are included in the pattern storage means, are so adapted that the density of an original pixel is preserved when an output is produced.

Further, by way of example, the plurality of reference patterns, which are located at exactly the same position on the image, that have different pixels of interest while pattern matching processing is being performed are such that the number of reference patterns that delete an image is greater than the number of reference patterns that add on an image reference patterns used to connect a discontinuous line.

Further, by way of example, the pixel substitution means is controllable in such a manner that when an operator performs a specific operation, a specific reference pattern will not be read out in response to this operation.

Further, according to another aspect of the present invention, the foregoing object is attained by providing an image processing apparatus comprising bilevel image signal input means for inputting an image obtained by converting a multilevel image to a bilevel image using pseudo-halftone processing; image storage means for storing the bilevel image in advance; pattern storage means for storing predetermined reference patterns and pixel substitution patterns corresponding to the reference patterns; pattern matching means for comparing a bilevel image read out of the image storage means and reference patterns read out of the pattern storage means; and pixel substitution means which, if a bilevel image signal is found to match a reference pattern by the pattern matching means, outputs a pixel substitution pattern, which corresponds to the reference pattern, that is composed of pixels finer, in at least one direction, than the pixels of the input bilevel image signal, and which, if there is no reference pattern that matches the bilevel image signal, outputs the bilevel image signal as is.

By way of example, the pattern storage means stores reference patterns that connects a discontinuous line in a case where a line image contained a bilevel image input from the bilevel image signal input means has been rendered discontinuous by one or more pixels, as well as the pixel substitution patterns.

Further, by way of example, the pixel substitution means includes substitution enabling signal storage means for storing a substitution enabling signal that corresponds to each pixel substitution pattern stored in the pattern storage means, wherein the pixel substitution means reads out a substitution enabling signal, which has been stored in the substitution enabling signal storage means, in response to an externally applied input, and executes substitution processing if substitution has been enabled.

Thus, as described above, the present invention adds on a pattern, that relates to the severance of fine lines peculiar to halftone processing which does not appear in a font character, thus making possible the excellent reproduction of images free of discontinuous lines even in regard to the fine lines of an image binarized by pseudo-halftone processing such as error diffusion.

By way of example, the local density of an image is preserved by using multiple sets of reference patterns and pixel substitution signals corresponding thereto, and it is so arranged that fine lines are not rendered discontinuous. As a result, not only can the breaking up of fine lines be avoided but it is also possible to solve, simply and easily, the problem of image degradation caused by pixel substitution that occurs in the halftone portions of natural images.

Further, in case of an image binarized by pseudo-halftone processing, a large number of patterns for connecting fine lines must be supported. This leads to an increase in the number of patterns and higher cost. However, by adopting an arrangement in which patterns that add on substitution pixels are made easier to apply in conformity with the characteristics of processing, the number of patterns is reduced. By arranging it so that neighboring signal values (or densities) are preserved in correlation with deleted patterns at such time, it is possible to suppress a decline in suppleness.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A to 4F are diagrams for describing in detail pattern matching and pixel substitution according to the first embodiment;

Figure 16:
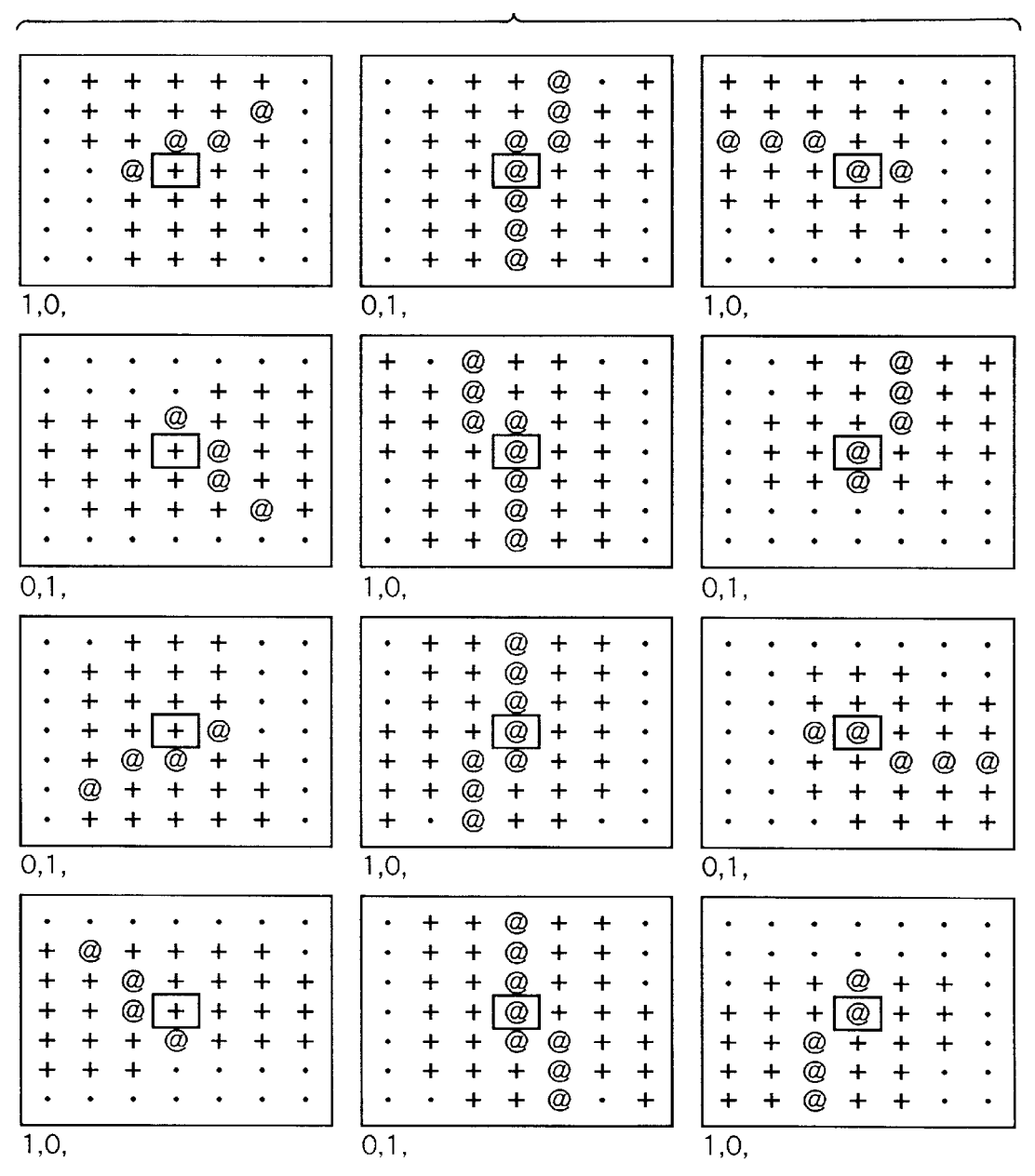

FIG. 16 is a diagram illustrating a list of patterns used at the time of both a printing operation and copying operation according to the fourth embodiment;

Figure 17:
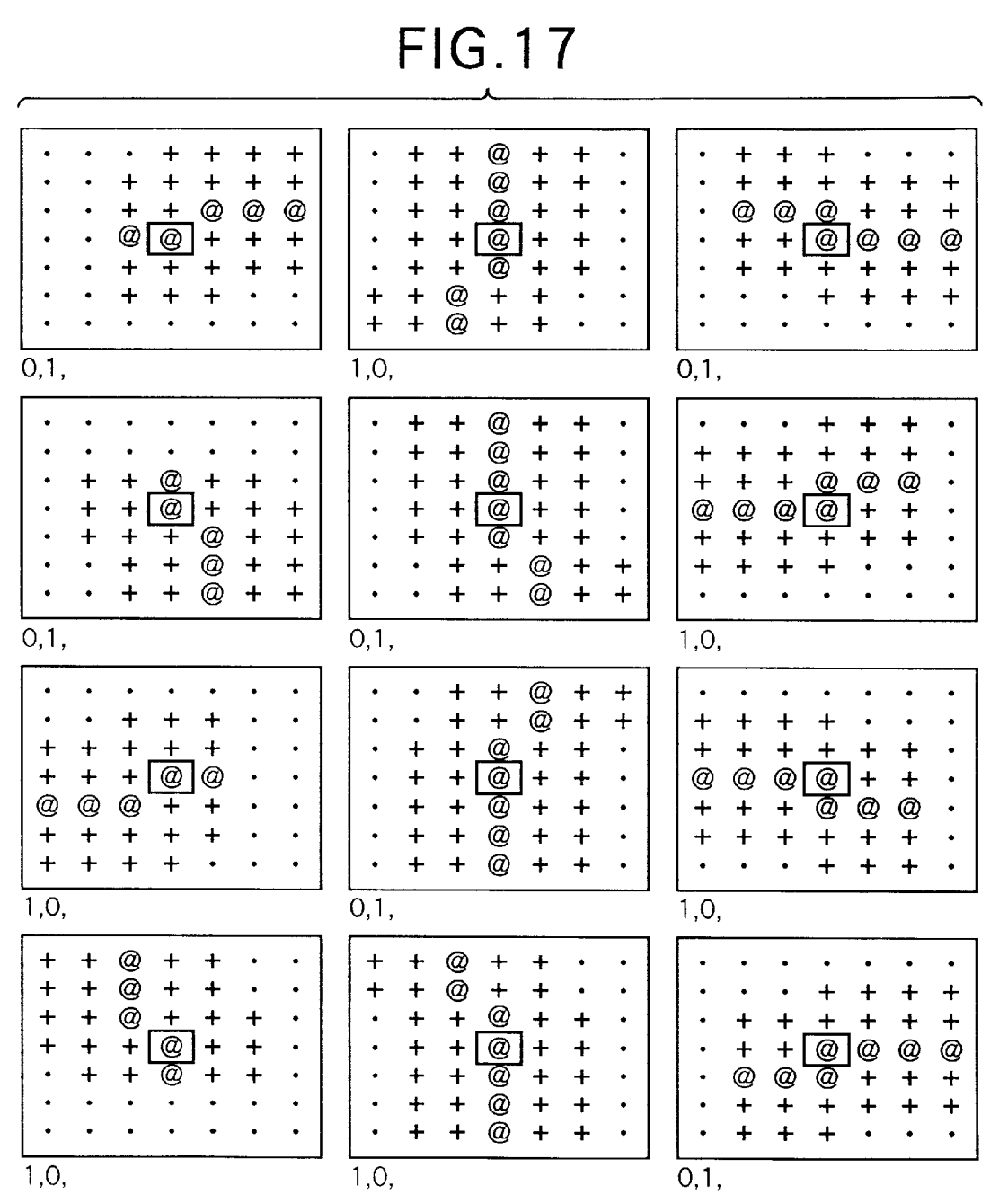

FIG. 17 is a diagram illustrating a list of patterns used at the time of both a printing operation and copying operation according to the fourth embodiment;

DESCRIPTION OF THE PREFERRED EMBODIMENTS

Preferred embodiments of the present invention will now be described in detail with reference to the drawings.

FIRST EMBODIMENT

An embodiment in which the present invention is applied to a copier will be described below. It should be noted that the present invention is not limited to application to a copier but can be applied to printers and various other image forming devices. Hence, there is no limitation upon the scope of application of the invention.

[Overview of apparatus]

Figure 1A:
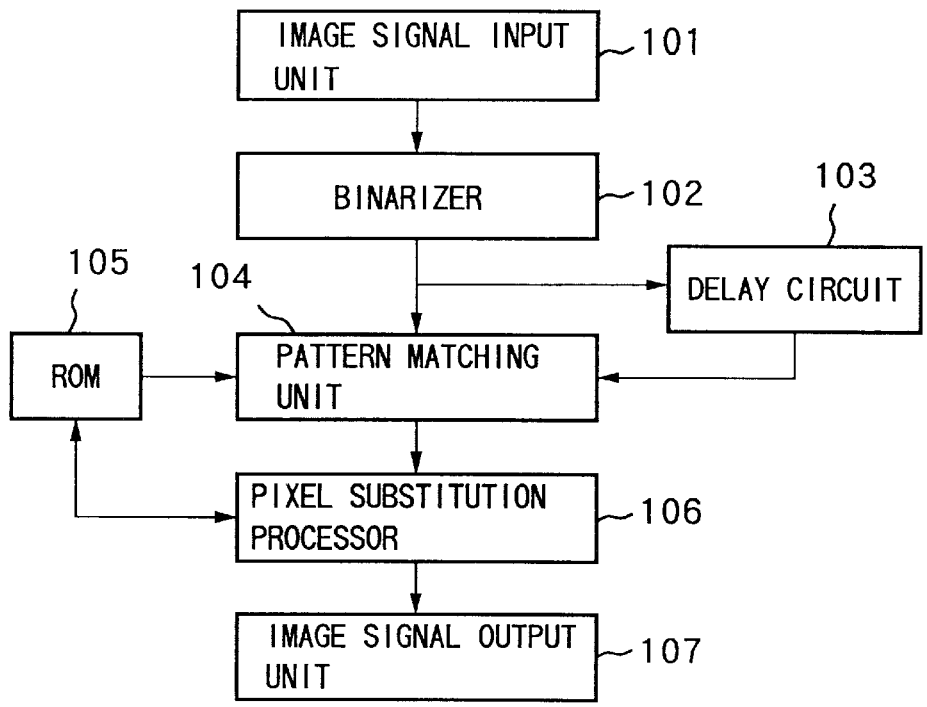
FIG. 1A is a block diagram illustrating the functional configuration of an image processor according to an embodiment of the present invention.

FIG. 1A is a block diagram illustrating the functional configuration of this embodiment of the present invention. The embodiment includes an image input unit 101 for inputting a multilevel digital image signal; a binarizing unit 102 for converting the multilevel digital image signal input from the image input unit 101 to a bilevel image of black pixels or white pixels; a delay circuit 103 for storing the bilevel image; a ROM 105 for storing predetermined reference patterns and pixel substitution patterns corresponding to the reference patterns; and a pattern matching unit 104 for comparing a bilevel image read out of the delay circuit 103 and reference patterns read out of the ROM 105; a pixel substitution processor 106 and an image signal output unit 107 for outputting an image signal obtained from the pixel substitution processor 106. If the result of the comparison performed by the pattern matching unit 104 indicates that the bilevel image matches one of the reference patterns read out of the ROM 105, the pixel substitution processor 106 goes to the ROM 105 to read out and output the pixel substitution pattern, which corresponds to the above-mentioned reference pattern, that is composed of pixels finer, in at least one direction, than the pixels of the bilevel image. If the result of the comparison performed by the pattern matching unit 104 indicates that there is no reference pattern that matches the bilevel image, then the pixel substitution processor 106 outputs the bilevel image as is.

Figure 1B:
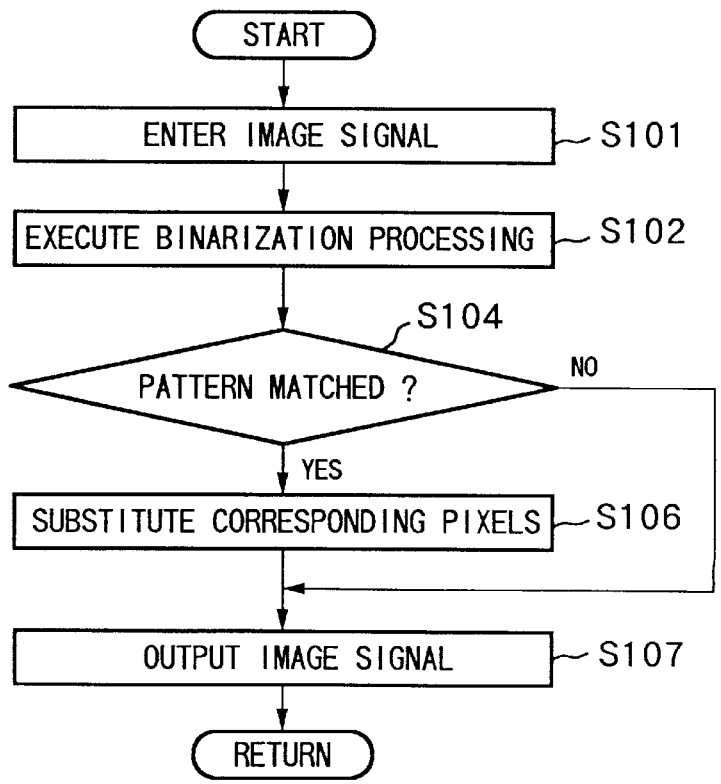
FIG. 1B is a flowchart illustrating an example of a processing procedure executed by the image processor of FIG. 1A.

The arrangement shown in FIG. 1A illustrates an image processing circuit, described later, the details of operation whereof will also be described below. In the image processing depicted in FIG. 1, an unnatural pattern, which does not appear in font characters, that is peculiar to halftone processing is added on, thereby making possible smooth reproduction even at the contours of characters in images that have been binarized by pseudo-halftone processing such as error diffusion.

An example of a method of implementing this involves using multiple sets of reference patterns and pixel substitution signals corresponding thereto to connect an image into the form of a straight line even the line image has been rendered discontinuous by an amount equivalent to one or more pixels. As a result, even a discontinuous image of a faint character can be reproduced smoothly to solve the problem of image degradation.

Further, when a line image that has been rendered discontinuous by one or more pixels is subjected to connecting processing by pattern matching while density is preserved, a very large number of reference patterns is required. In order to avoid this, the number of patterns that add on image signals by pixel substitution patterns is made smaller than the number of patterns that remove image signals. This makes it possible to reduce the number of reference patterns.

Figure 2:
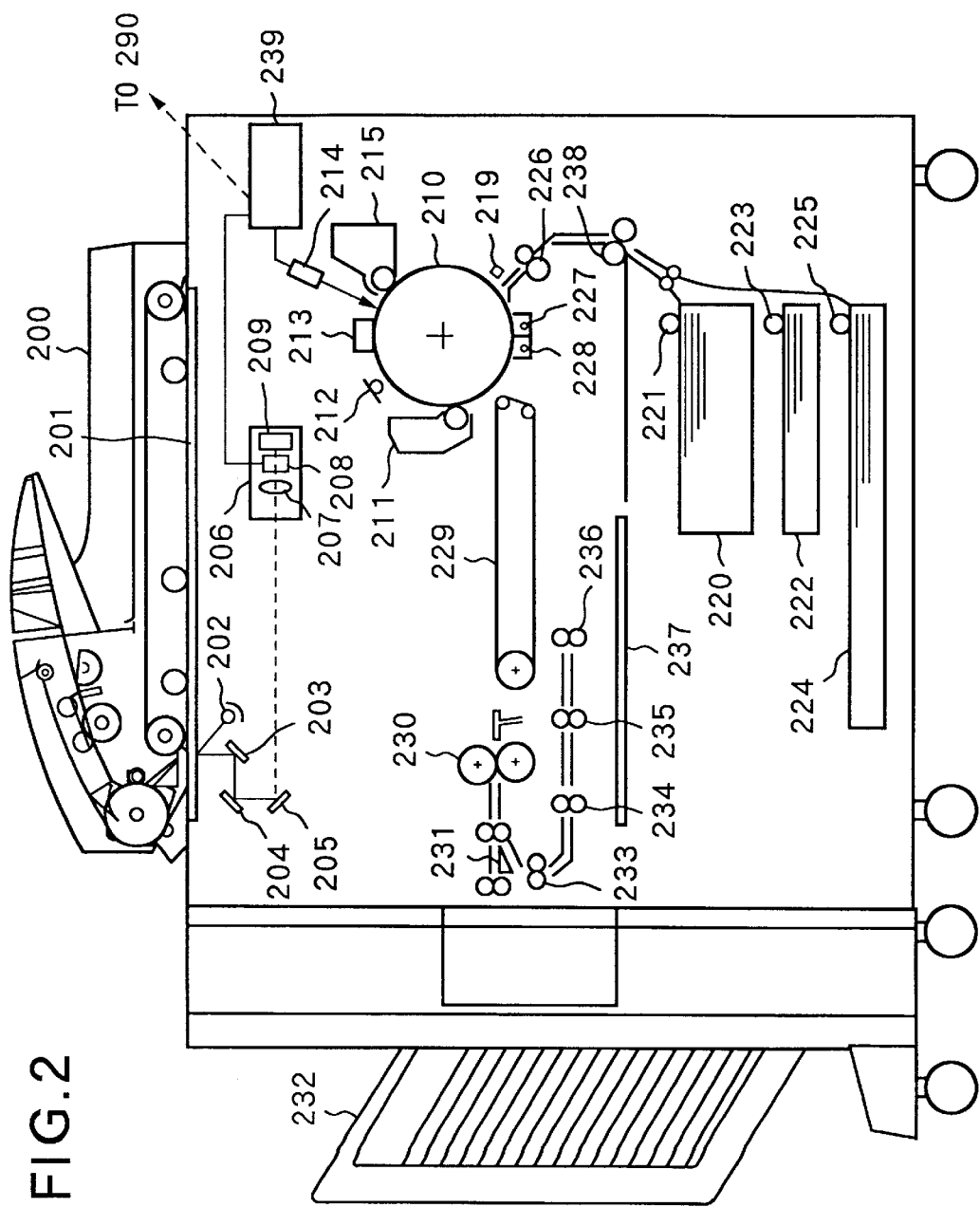
FIG. 2 is a sectional view illustrating the construction of a copier according to a first embodiment of the present invention.

FIG. 2 is an external view of a copier serving an embodiment having the above-described functions.

As shown in FIG. 2, the copier includes an automatic document feeder 200 capable of feeding a plurality of originals automatically one sheet at a time and of placing the originals on a platen successively top-side down and bottom-side down. Since the details of this mechanism are well known, they are not described here. A plurality of originals to be scanned on placed on the document feeder 200. The originals so placed are fed one sheet at a time by the document feeder 200 and transported to a platen 201.

A document illuminating lamp 202 comprising a halogen lamp exposes to light the original that has been placed on the glass platen 201. Scanning mirrors 203, 204, 205, which are incorporated in an optical scanning unit (not shown), introduce reflected light from the original to a CCD unit 206 while being moved back and forth. The CCD unit 206 comprises an image forming lens 207 for forming an image of the reflected light from the original on a CCD (charge-coupled device), an image sensing device 208 constituted by a CCD, and a CCD driver 209 for driving the image sensing device 208. An image signal output from the image sensing device 208 is converted to digital data composed of, say, eight bits, after which the digital data is applied to a controller 239.

A photosensitive drum 210 is de-electrified by a pre-exposure lamp 212 to prepare it for subsequent image formation. A corona discharge device 213 charges the photosensitive drum 210 uniformly. Exposure means 214, which is constituted by a semiconductor laser or the like, forms an electrostatic latent image on the surface of the photosensitive drum 210 by exposing the same to light on the basis of the image data processed by the controller 239, which performs image processing and controls the overall apparatus.

A developing unit 215 contains developing agent (toner) of the color black, by way of example. A pre-transfer corona discharge unit 219 applies a high voltage before the toner image that has been developed on the photosensitive drum 210 is transferred to recording paper. Paper feed units 220, 222, 224 have corresponding paper feed rollers 221, 223, 225, respectively, which are driven to feed transfer paper into the apparatus. The transfer paper is stopped temporarily at the position of a registration roller 226 and then is fed again upon being synchronized to the timing at which the image that has been formed on the photosensitive drum 210 is transferred.

A transfer corona discharge device 227 transfers the toner image developed on the photosensitive drum 210 from the drum to the transfer paper fed to the drum. A separating corona discharge device 228 separates the transfer paper, to which the transfer of the image has been completed, from the photosensitive drum 210. Untransferred toner remaining on the photosensitive drum 210 is recovered by a cleaner 211.

A conveyance belt 229 transports the transfer paper that has undergone the transfer process to a fixing unit 230. Here the toner image is fixed as by the application of heat. The path along which the transfer paper bearing the fixed image is transported is changed over and controlled by a flapper 231, which directs the paper in the direction of a discharge tray 232 or in the direction of an intermediate tray 237 at the conclusion of a single copying operation.

Feed rollers 233~236 feed the transfer paper, which has undergone the fixing process one time, to the intermediate tray 237 after turning the paper over (for multiple printing on the same side) or not turning the paper over (for double-sided printing). A re-feed roller 238 conveys transfer paper, which has been placed in the intermediate tray 237, to the position of the registration roller 226 again. The controller 239 is equipped with a microcomputer and image processor, described later, and performs the above-described image forming operation in accordance with commands from a control panel 290.

[Controller Details]

Figure 3:
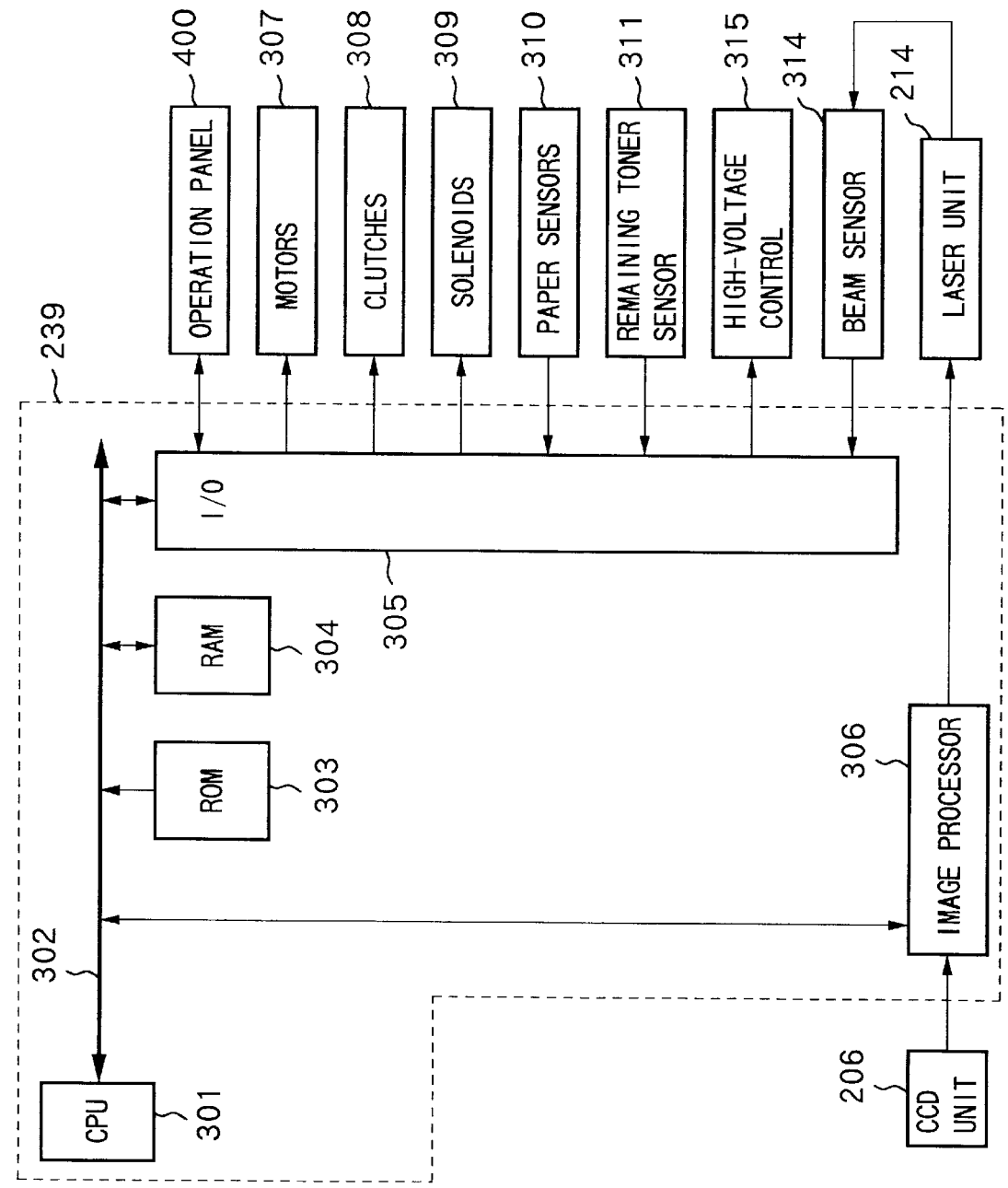
FIG. 3 is a diagram useful in describing the flow of processing of an image forming apparatus according to the first embodiment.

FIG. 3 is a block diagram showing the details of the controller 239 in the copier according to the embodiment shown in FIG. 2. As shown in FIG. 3, the controller 239 includes a CPU 301 for overall control of the embodiment and for overall control of the controller 239. The CPU 301 reads the control procedure (control program) of the apparatus out of a read-only memory (ROM) 303, in which the program has been stored, in successive fashion and executes various control operations, described later.

The CPU 301 is connected to the various components via a CPU bus 302. A random-access memory (RAM) 304 is a main memory device used for storing input data and employed as a working storage area. An I/O interface 305 is connected to the loads of the apparatus, such as a control panel 400, which the operator uses to make inputs from keys and which has a liquid crystal display and LEDs, etc., for displaying such information as the status of the apparatus, various motors 307, clutches 308 and solenoids 309 for driving the paper feed system, paper transport system and optics unit, and various paper sensors 310 for sensing the transported paper.

The developing unit 215 is provided with a remaining toner sensor 311 for sensing the amount of toner remaining inside the developing unit. The output signal of the sensor 311 is input to the I/O port 305. In accordance with a command from the CPU 301, a high-voltage unit 315 controls the supply of high-voltage power to the corona discharge device 213, developing unit 215, pre-transfer corona discharge device 219, transfer corona discharge device 227 and separating corona discharge device 228.

The image signal output by the CCD unit 206 enters an image processor 306, which subjects the signal to image processing, described later, and outputs a control signal to a laser unit 214 to control the laser in accordance with the image data obtained. As a result, a laser beam emitted by the laser unit 214 irradiates the photosensitive drum 210.

[Image Processor]

The construction of the image processor is as shown in FIG. 1A. The image signal delivered to the image signal output unit 107 has a resolution higher, in at least one direction, than that of the image signal applied to the image input unit 101. The procedure of processing executed by the image processor shown in FIG. 1A will now be described in detail with reference to the flowchart of FIG. 1B.

The image input unit 101 provides a multilevel digital image signal (step S101) obtained by converting a luminance image signal, which has been obtained by reading a document using a solid-state image sensing device such as a CCD, to an image signal of linear density in order to achieve conformity with the characteristics of the human eye. In this embodiment, one pixel is composed of eight bits, which are capable of representing 256 tones.

The binarizing unit 102 converts this multilevel digital image signal, which enters from the image input unit 101, to a bilevel signal indicative of the dot (ON when the signal is logical "1" and OFF when the signal is logical "0") of one pixel (step S102). This is performed while gradation is maintained artificially. The binarizing unit 102 performs this binarization processing by, e.g., the error diffusion method. The bilevel image signal binarized by the binarizing unit 102 is stored by the delay circuit 103 for as long as needed for pattern matching.

Using the stored bilevel image signal and the latest image signal obtained by binarization, and in accordance with the predetermined size of a matrix for pattern matching, the pattern matching unit 104 performs pattern matching (step S104) between the bilevel image signal and all reference patterns stored in the ROM 105. If a match between the bilevel image signal and one reference pattern is obtained by pattern matching processing ("YES" at step S104), then the pixel substitution processor 106 goes to the ROM 105 to read out the pixel substitution pattern that corresponds to the reference pattern for which the match was obtained (step S106). The pixel substitution processor 106 outputs this pattern to the image signal output unit 107 (step S107).

If the bilevel image signal does not match any of the reference patterns ("NO" at step S104), then the pixel substitution processor 106 outputs the bilevel image signal as is. However, considering the fact that the output image signal has a resolution higher, in at least one direction, than that of the input image signal, the pixel substitution processor 106 outputs a plurality of signals, each of which has the same area as that of the input image signal, at the same position (step S107).

For the sake of simplicity, this embodiment will be described assuming that the matrix size for pattern matching is 7×7 pixels, the resolution of the input is 300×300 dpi and the resolution of the output is 600×300 dpi. Accordingly, use is made of an output image signal that is the result of splitting the pixels of the input image signal into two halves in the horizontal direction. The output resolution in the horizontal direction, therefore, is twice that of the input resolution.

FIGS. 4A to 4F are diagrams for describing pattern matching processing. Pattern matching processing according to this embodiment will now be described with reference to FIGS. 4A to 4F.

FIG. 4A illustrates one example of a bilevel image. This is an image that has been subjected to pseudo-halftone processing and represents a fine line rising gradually to the right and having a thickness of one pixel. Since pseudo-halftone processing has been applied, the fine line, which should rightfully be a continuous, unbroken line, is a discontinuous line owing to the attempt to express halftones.

In this embodiment, the location at which the fine line is rendered discontinuous owing to such pseudo-halftone processing is subjected to pattern matching and dots are rearranged by output pixels having a higher resolution, thereby making it possible to prevent the breaking up of fine lines in a scanned image that has been binarized after being read. This could not be achieved with the prior art.

FIG. 4B shows one example of a reference pattern that has been stored in the ROM 105. This reference pattern is formed by 7×7 pixels and is compared with the original image. If the positions of white pixels in the original image agree with the positions of white pixels in the reference pattern and the positions of black pixels in the original image agree with the positions of black pixels in the reference pattern, then it is construed that the original image matches the reference pattern and a pixel substitution is carried out.

FIG. 4C illustrates a pixel substitution pattern that corresponds to the reference pattern of FIG. 4B stored in the ROM 105. If the bilevel image signal shown at FIG. 4A matches the reference pattern shown at FIG. 4B, then FIG. 4C is the pixel substitution pattern used when the pixel of interest is that in row d, column 4 of the matrix.

FIG. 4D illustrates a pixel substitution pattern that corresponds to the reference pattern of FIG. 4B stored in the ROM 105. If the bilevel image signal shown at FIG. 4A matches the reference pattern shown at FIG. 4B, then FIG. 4D is the pixel substitution pattern used when the pixel of interest is that in row e, column 4 of the matrix.

FIG. 4E illustrates a pixel substitution pattern that corresponds to the reference pattern of FIG. 4B stored in the ROM 105. If the bilevel image signal shown at FIG. 4A matches the reference pattern shown at FIG. 4B, then FIG. 4D is the pixel substitution pattern used when the pixel of interest is that in row e, column 5 of the matrix.

FIGS. 4C, 4D and 4E are pixel substitution patterns obtained by splitting pixels in half vertically in order to convert a 300×300-dpi multilevel input image into a 600×300-dpi bilevel output image according to this embodiment.

Since a location that matches the reference pattern shown in FIG. 4B is present on the image shown at FIG. 4A, the pixels at row d, column 4; row e, column 4; and row e, column 5 in FIG. 4A are replaced by the three pixel substitution patterns of FIGS. 4C, 4D and 4E that correspond to the three pixels of interest of the reference pattern shown in FIG. 4B.

FIG. 4F shows the image obtained by replacing the above-mentioned pixels by the pixel substitution patterns. This shows an example in which the discontinuous thin line has been connected by the smoothing processing according to the present embodiment of the invention.

Thus, in accordance with this embodiment, a plurality of pixels of interest of a pattern regarded as being a discontinuous fine line peculiar to pseudo-halftone processing are replaced using pixel substitution patterns if a match with a reference pattern is achieved. As a result, it is possible to connect the broken portion of a fine line, which is a problem that arises when binarization of an image is carried out.

Further, in regard to an image obtained using binarization of pseudo-halftones, a natural image is often the input image and texture may be recognized erroneously as the edge of a character. A pronounced decline in image quality can occur especially at portions of the image having intermediate density.

In this embodiment of the present invention, the area of black pixels is preserved in the output image, as will be evident by comparing FIGS. 4A and 4F. As a result, a pattern the same as the halftone portion of a natural image appears and the sum total of the signal values of the image is preserved even though pixels are replaced. This makes it possible to prevent the image from developing a lack of suppleness, which can be caused by smoothing processing according to the prior art.

According to this embodiment, an example in which signal values are preserved is illustrated. It goes without saying, however, that when an image is output to a medium such as paper using a device that outputs an electronic photograph, a pattern can be changed so as to perform pixel substitution that preserves density. Further, according to this embodiment, pattern matching is carried out using a square 7×7 pixel matrix. However, it goes without saying that the present invention can be practiced without limiting the size and shape of the pattern matching matrix to 7×7 pixels and the square geometry.

Further, this embodiment has been described assuming that the resolutions of the input and output images are 300×300 dpi and 600×300 dpi, respectively. However, if the resolution of the output image is higher than that of the input image in at least one direction, as in the case of an output image having a resolution of 600×300 dpi obtained by splitting the pixels of the input image into upper and lower halves, then the present invention is not limited to these resolutions and resolution ratios.

SECOND EMBODIMENT

In the first embodiment described above, processing is executed upon providing a plurality of pixels of interest and a plurality of pixel substitution patterns for one reference pattern. In an actual processing system, however, the amount of processing can be reduced by fixing the pixel of interest and adopting a central pixel as the pixel of interest. In the second embodiment, substitution processing is executed using three different reference patterns in such a manner that the three pixels of interest in FIG. 4B become the central pixel.

Figure 5A:
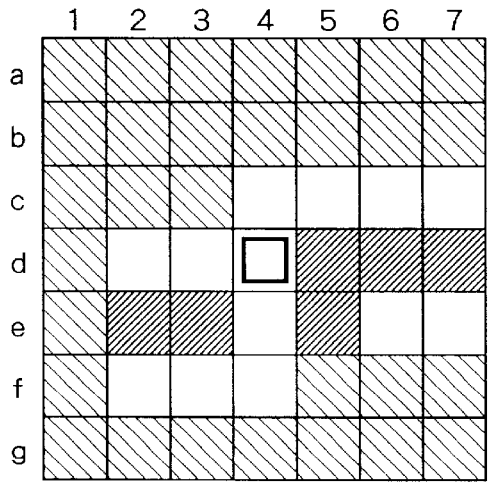
FIGS. 5A to 5C are diagrams for describing in detail pattern matching and pixel substitution according to a second embodiment.
Figure 5B:
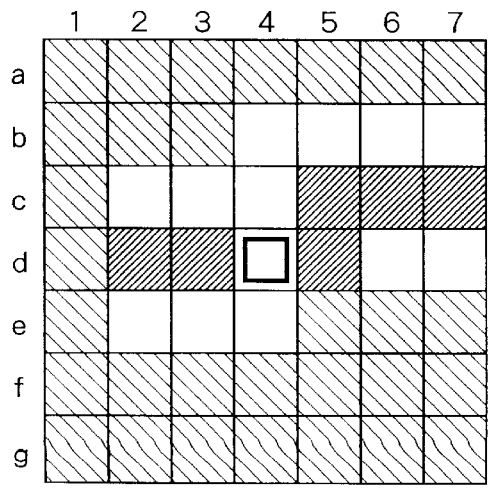
Figure 5C:
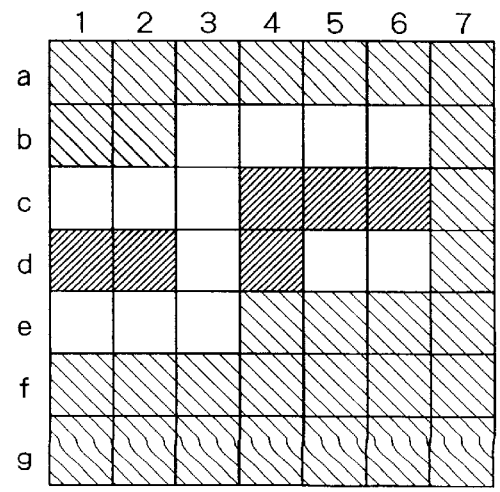

The second embodiment of the present invention will be described with reference to FIGS. 5A to 5C. The basic components constituting the second embodiment are similar to those of the first embodiment shown in FIGS. 1A through 3 and need not be described again. FIGS. 5A to 5C are useful in describing pattern matching processing according to the second embodiment.

The pixels indicated by hatching in the matrices of FIGS. 5A to 5C are pixels that have no influence upon matching regardless of whether they are white or black.

FIG. 5A shows a reference pattern when the pixel of row d, column 4 in FIG. 4B is adopted as the pixel of interest. FIG. 5B shows a reference pattern when the pixel of row e, column 4 in FIG. 4B is adopted as the pixel of interest. FIG. 5C shows a reference pattern when the pixel of row e, column 5 in FIG. 4B is adopted as the pixel of interest.

In the second embodiment, a plurality of reference patterns in which the pixel of interest is thus fixed as the central pixel are used. This method also makes it possible to realize processing equivalent to pattern matching having a plurality of pixels of interest such as shown in FIG. 4B. It will be understood that FIGS. 5A to 5C are obtained by translating the patterns of the effective pixels (namely the pixels that are not hatched).

In a case where pixel substitution has taken place following detection of the pattern of FIG. 5A on an image, it is important that when processing shifts to a pixel one row immediately therebelow, the pattern of FIG. 5B will always be detected followed by the execution of pixel substitution. Similarly, the pattern of FIG. 5C is always detected when the pixel of interest is shifted one row down and one column after followed by the execution of pixel substitution.

For example, in a case where the pattern having the pixel of row d, column 4 in FIG. 5A as the pixel of interest has been detected, it is required that the pixel substitutions shown at FIGS. 4C, 4D and 4E be carried out in principle without omission. In the second embodiment, it can be so arranged that even though use is made of a matrix in which the pixel of interest is fixed, a pattern at the same position in the image is detected by a plurality of reference patterns and pixel substitution based upon pixel substitution patterns corresponding to this reference pattern is performed in principle without omitting any substitutions. This makes it possible to realize effects similar to these indicated in the first embodiment.

Thus, even though the pixel of interest is shifted one pixel at a time, a pixel pattern in the same area of the image is detected using a plurality of reference patterns and an unnatural pattern peculiar to pseudo-halftones is corrected while signal value (density) is preserved, thus making smooth reproduction possible.

THIRD EMBODIMENT

In the first and second embodiments, pattern matching is used to make it possible to connect a discontinuous fine line that becomes a problem when binarization is performed by pseudo-halftone processing. In order to execute this processing, however, the number of pattern matching operations becomes fairly large, as will be set forth below. A third embodiment that makes it possible to achieve actions and effects similar to those mentioned above but with a smaller number of pattern matchings will be described with reference to FIGS. 6, 7A and 7B.

Figure 6:
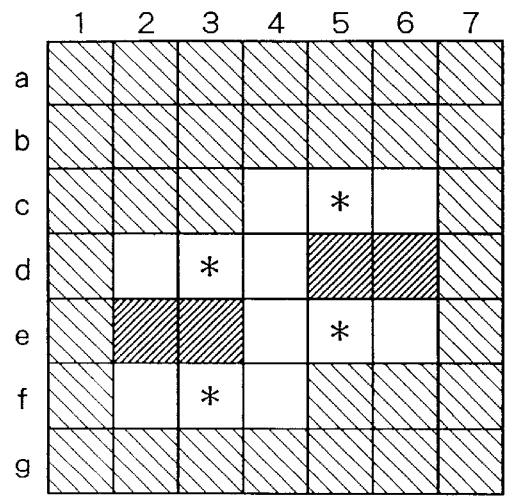
FIG. 6 is a diagram for describing in detail pattern matching and pixel substitution according to a third embodiment.
Figure 7A:
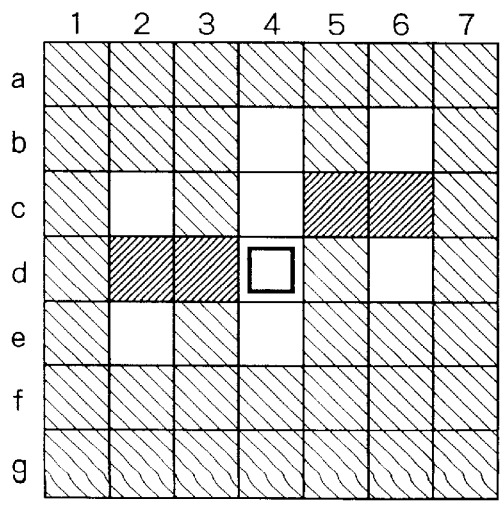
FIGS. 7A and 7B are diagrams for describing in detail pattern matching and pixel substitution according to the third embodiment.
Figure 7B:
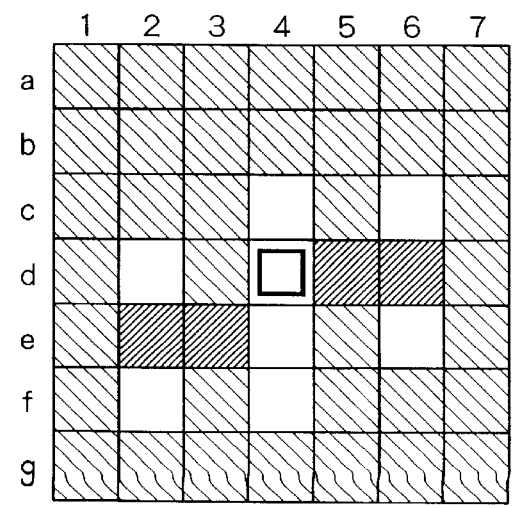

FIGS. 6, 7A and 7B are diagrams useful in describing the details of pattern matching and pixel substitution according to the third embodiment. The basic components constituting the third embodiment are similar to those of the first embodiment shown in FIGS. 1A through 3 and need not be described again.

In the third embodiment, it is assumed that an image in which a fine line has been rendered discontinuous in the manner shown in FIG. 6 is the result of binarization by pseudo-halftone processing. There is a case where the four pixels marked by the asterisks in FIG. 6 are black and a case in which they are white independently of one another. Even if only a case in which a transverse fine line rising to the right is considered, $2^4$ or 16 patterns will be generated.

Furthermore, in order to make possible processing for connecting a fine line in the manner set forth in the first and second embodiments, two pixels of interest are adopted at d4 and e4 in addition to the four pixels marked by the asterisks. In the example of FIG. 6, d4 and e4 are pixels replaced by pixel substitution patterns that become additional black pixels.

In this case, patterns (16 in number) would heretofore be generated in regard to each of d4 and e4 by combinations of the black and white pixels marked by the asterisks. In other words, 16×2 or 32 patterns would be necessary. If consideration is given to similar patterns having different orientations such as patterns rising sharply to the right or left obtained by rotation through 90°, 32×4 or 128 patterns would be required.

In the third embodiment, therefore, the portions marked by the asterisks are placed in a state in which matching is achieved for black or white, thereby making it possible to obtain the same effects with fewer patterns. Since two patterns will suffice where 16 patterns are necessary in regard to one direction, a total of 2×4 or 8 patterns will be sufficient, thus eliminating processing 120 patterns.

Matching is thus made easier by relaxing the conditions of reference patterns having substitution pixels that add on black in comparison with reference patterns having substitution pixels that eliminate black. As a result, effects similar to those described above can be obtained while reducing the number of patterns. Further, even if the number of reference patterns having substitution pixels that add on black is reduced, control is performed in such a manner that the corresponding relationship between these reference patterns and reference patterns having substitution pixels that eliminate black remains the same. As a result, neighboring signal values (or densities) before and after substitution processing are preserved and a lack of image suppleness can be eliminated or mitigated even if matching is achieved at halftone portions.

FOURTH EMBODIMENT

Figure 8A:
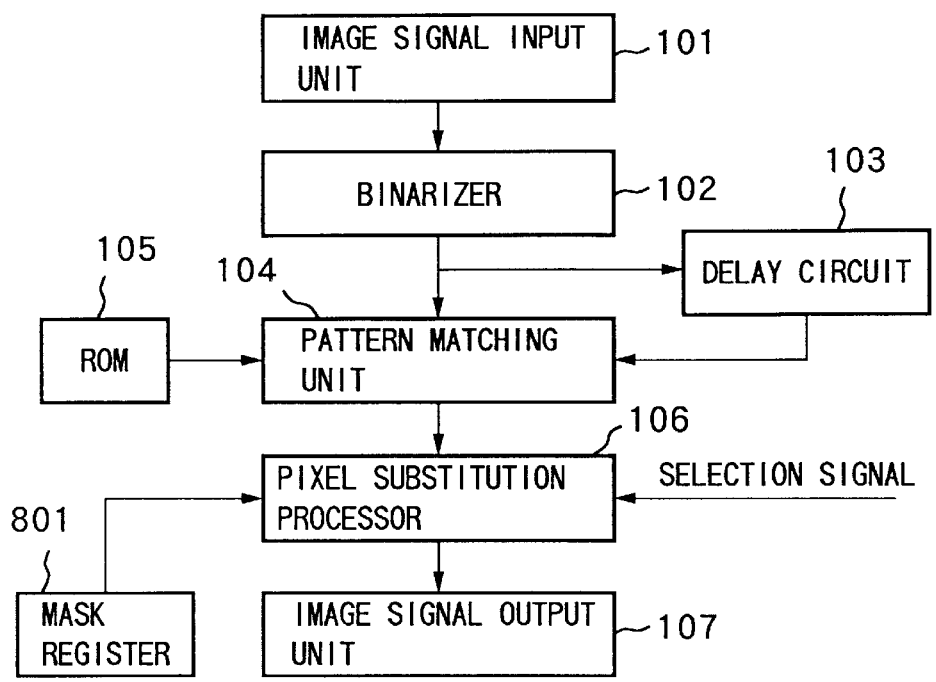
FIG. 8A is a block diagram illustrating the functional configuration of an image processor according to a fourth of the present invention.

A fourth embodiment of the present invention will now be described. FIG. 8A is a functional block diagram illustrating image processing according to the fourth embodiment. Components in FIG. 8A identical with those of the first embodiment shown in FIG. 1A are designated by like reference characters.

Figure 8B:
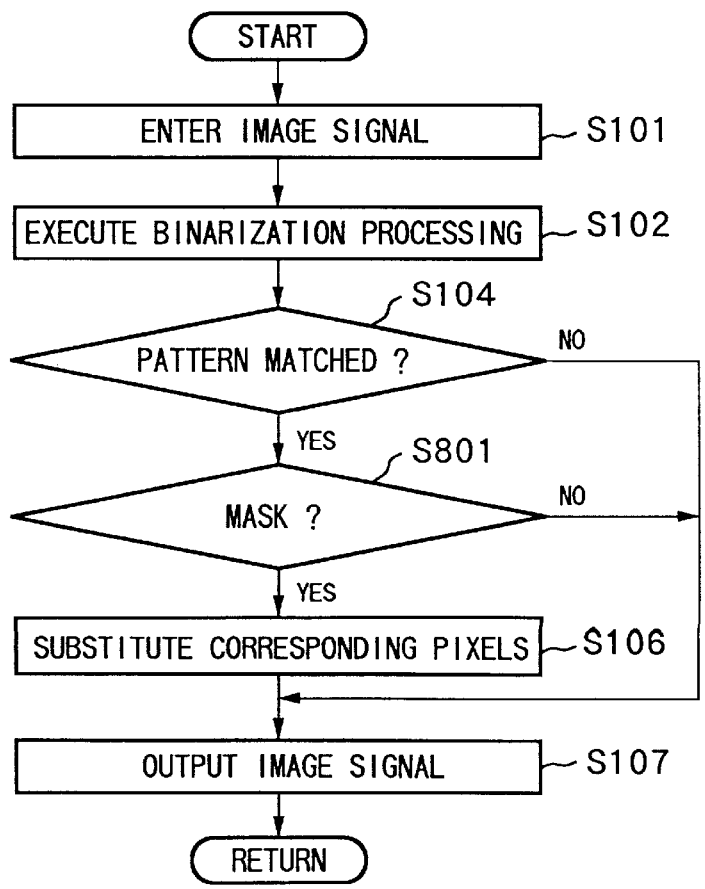
FIG. 8B is a flowchart illustrating an example of a processing procedure executed by the image processor of FIG. 8A.

The arrangement of FIG. 8A includes the image input unit 101, binarizing unit 102, delay circuit 103, pattern matching unit 104, ROM 105, pixel substitution processor 106, image signal output unit 107 and a mask register 801. The image signal delivered to the image signal output unit 107 has a resolution higher, in at least one direction, than that of image applied to the image input unit 101. The procedure of processing executed by the image processor shown in FIG. 8A will now be described in detail with reference to the flowchart of FIG. 8B.

The image input unit 101 provides a multilevel digital image signal (step S101) obtained by converting a luminance image signal, which has been obtained by reading a document using a solid-state image sensing device such as a CCD, to an image signal of linear density in order to achieve conformity with the characteristics of the human eye. In this embodiment, one pixel is composed of eight bits, which are capable of representing 256 tones. However, the invention is not limited to this example.

The binarizing unit 102 converts this multilevel digital image signal, which enters from the image input unit 101, to a bilevel signal indicative of the dot (ON when the signal is logical "1" and OFF when the signal is logical "0") of one pixel (step S102). This is performed while gradation is maintained artificially. The binarizing unit 102 performs this binarization processing by, e.g., the error diffusion method. The bilevel image signal binarized by the binarizing unit 102 is stored by the delay circuit 103 for as long as needed for pattern matching.

Using the bilevel image signal that has been stored in the delay circuit 103 and the latest image signal obtained by binarization, and in accordance with the predetermined size of a matrix for pattern matching, the pattern matching unit 104 performs pattern matching (step S104) between the bilevel image signal and all reference patterns stored in the ROM 105.

If a match between the bilevel image signal and one reference pattern is obtained by pattern matching processing ("YES" at step S104), then the pixel substitution processor 106 goes to the mask register 801 to read out the value of an address corresponding to the reference pattern for which the match was obtained (step S801). In a case where a substitution enabling signal was being applied to the corresponding address of the mask register 801 ("NO" at step S801), the pixel substitution processor 106 goes to the ROM 105 to read out the pixel substitution pattern corresponding to the reference pattern for which the match was obtained (step S106). The pixel substitution processor 106 outputs this pattern to the image signal output unit 107 (step S107).

If a substitution enabling signal was not being applied to the corresponding address of the mask register 801 ("YES"

at step S801), then the pixel substitution processor 106 outputs the bilevel image signal as is (step S107). However, considering the fact that the output image signal has a resolution higher, in at least one direction, than that of the input image signal, the pixel substitution processor 106 outputs a plurality of signals, each of which has the same area as that of the input image signal, at the same position (step S107).

Further, the pixel substitution processing means accepts an externally applied selection signal and, in response thereto, pre-selects a corresponding register from among one or more of the mask registers 801. If no match with any of the reference patterns is achieved ("NO" at step S104), then the binarized image is output as is. In this case, considering the fact that the output image signal has a resolution higher, in at least one direction, than that of the input image signal, the pixel substitution processor 106 outputs a plurality of signals, each of which has the same area as that of the input image signal, at the same position (step S107).

The selection signal is a signal that specifies changeover between a copying mode and a printer mode activated in response to acceptance of a signal from a computer or the like.

Depending upon the image data output by a computer, it is conceivable that there will be image data in which image quality is markedly degraded by a pattern connecting a fine line image rendered discontinuous by one or more pixels described in the first, second and third embodiments. A dot image such as a screen image is an example of such an image in which there is a particularly great decline in image quality.

In order to prevent this, the fourth embodiment is so adapted that in a case where the selection signal designates printer operation, a pixel substitution enabling signal is read out of the corresponding master register at the time of the printing operation if pattern matching is achieved with the pixel of interest. In the presence of the enabling signal, the pixel substitution processor 106 goes to the ROM 105 to read out the pixel substitution pattern corresponding to the reference pattern for which matching was obtained and outputs this pattern to the image signal output unit 107. In the absence of the enabling signal, the pixel substitution processor 106 outputs the binarized image signal as is. However, considering the fact that the output image signal has a resolution higher, in at least one direction, than that of the input image signal, the pixel substitution processor 106 outputs a plurality of signals, each of which has the same area as that of the input image signal, at the same position.

Figure 9:
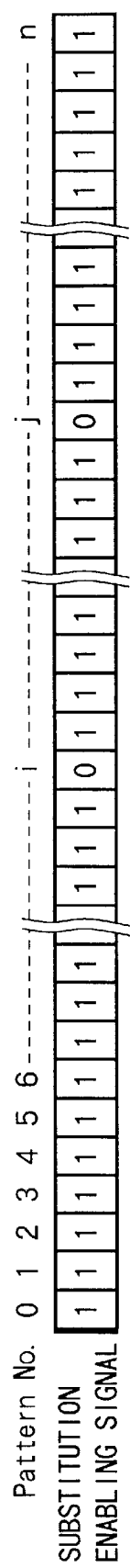
FIG. 9 is a diagram useful in describing a mask register according to the fourth embodiment.
Figure 10:
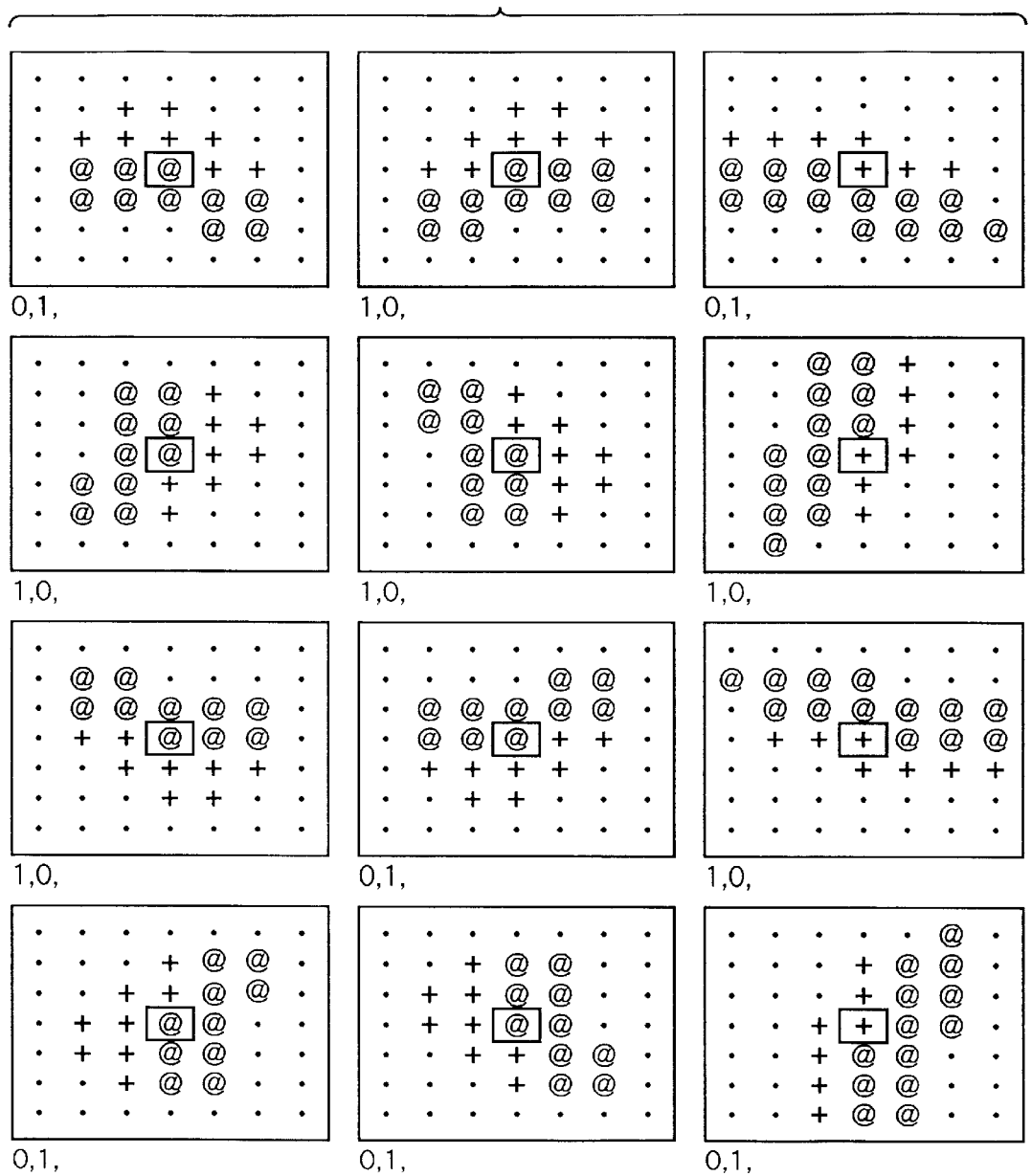
FIG. 10 is a diagram illustrating a list of patterns used at the time of both a printing operation and copying operation according to the fourth embodiment.
Figure 11:
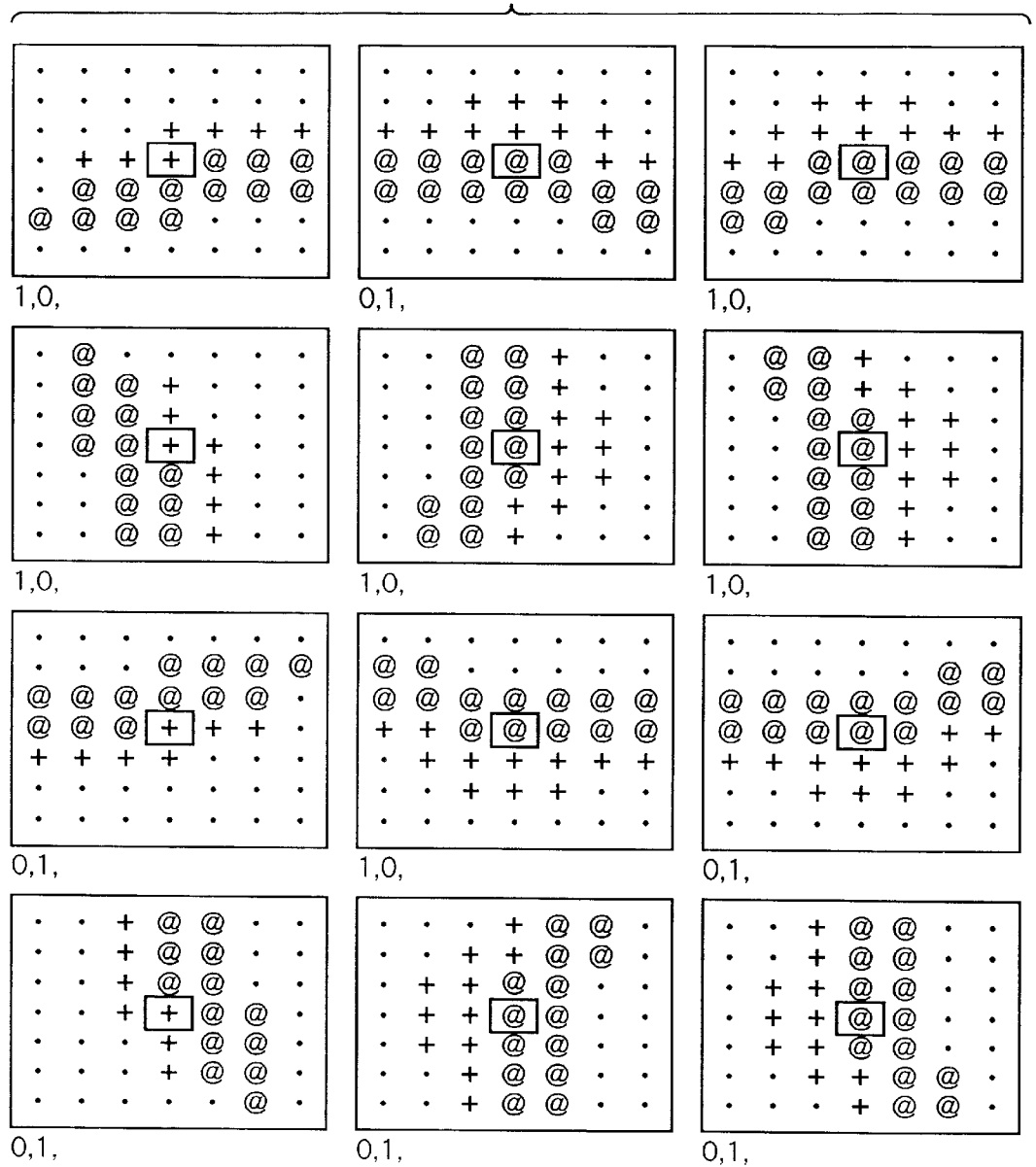
FIG. 11 is a diagram illustrating a list of patterns used at the time of both a printing operation and copying operation according to the fourth embodiment.
Figure 12:
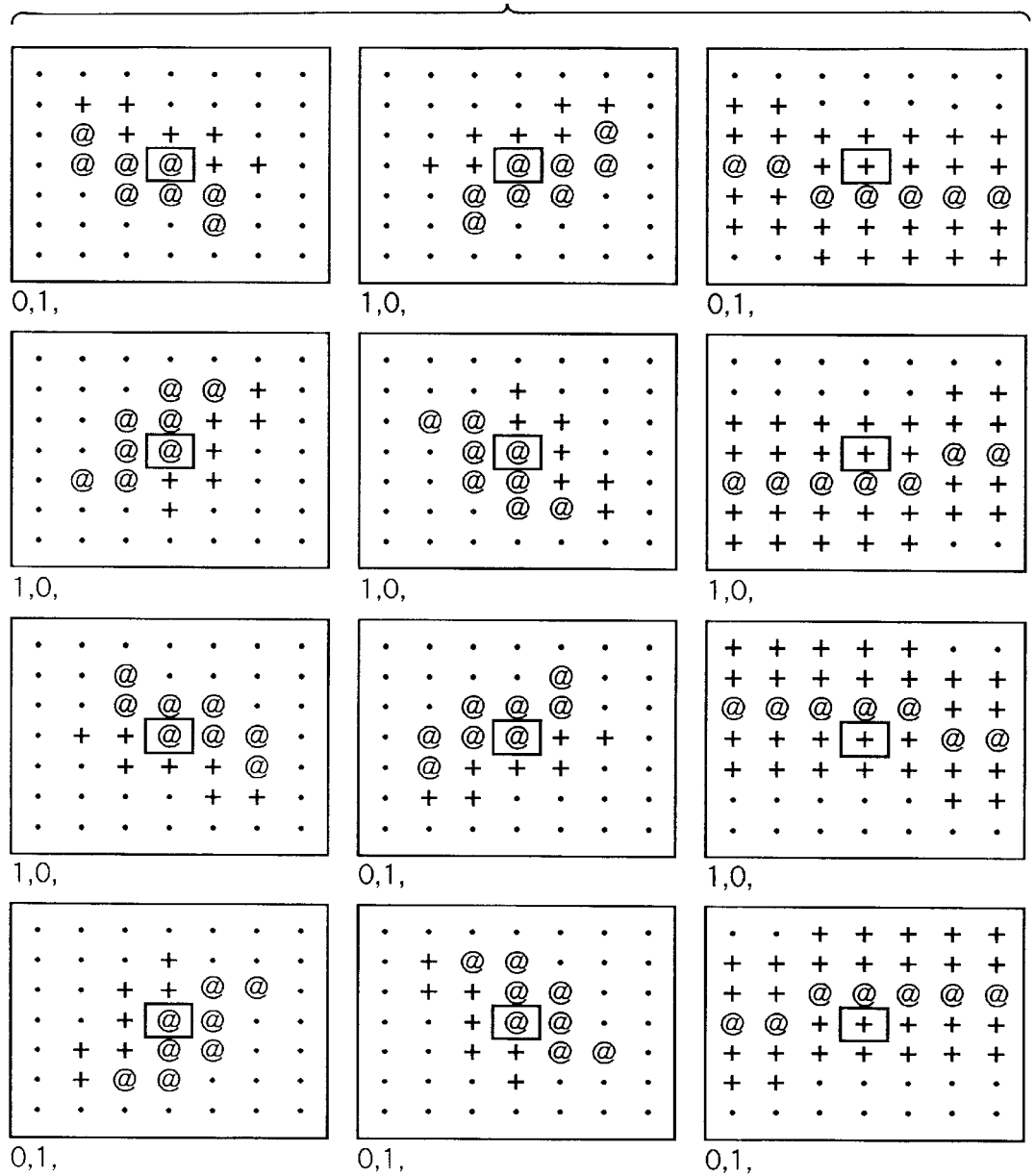
FIG. 12 is a diagram illustrating a list of patterns used at the time of both a printing operation and copying operation according to the fourth embodiment.
Figure 13:
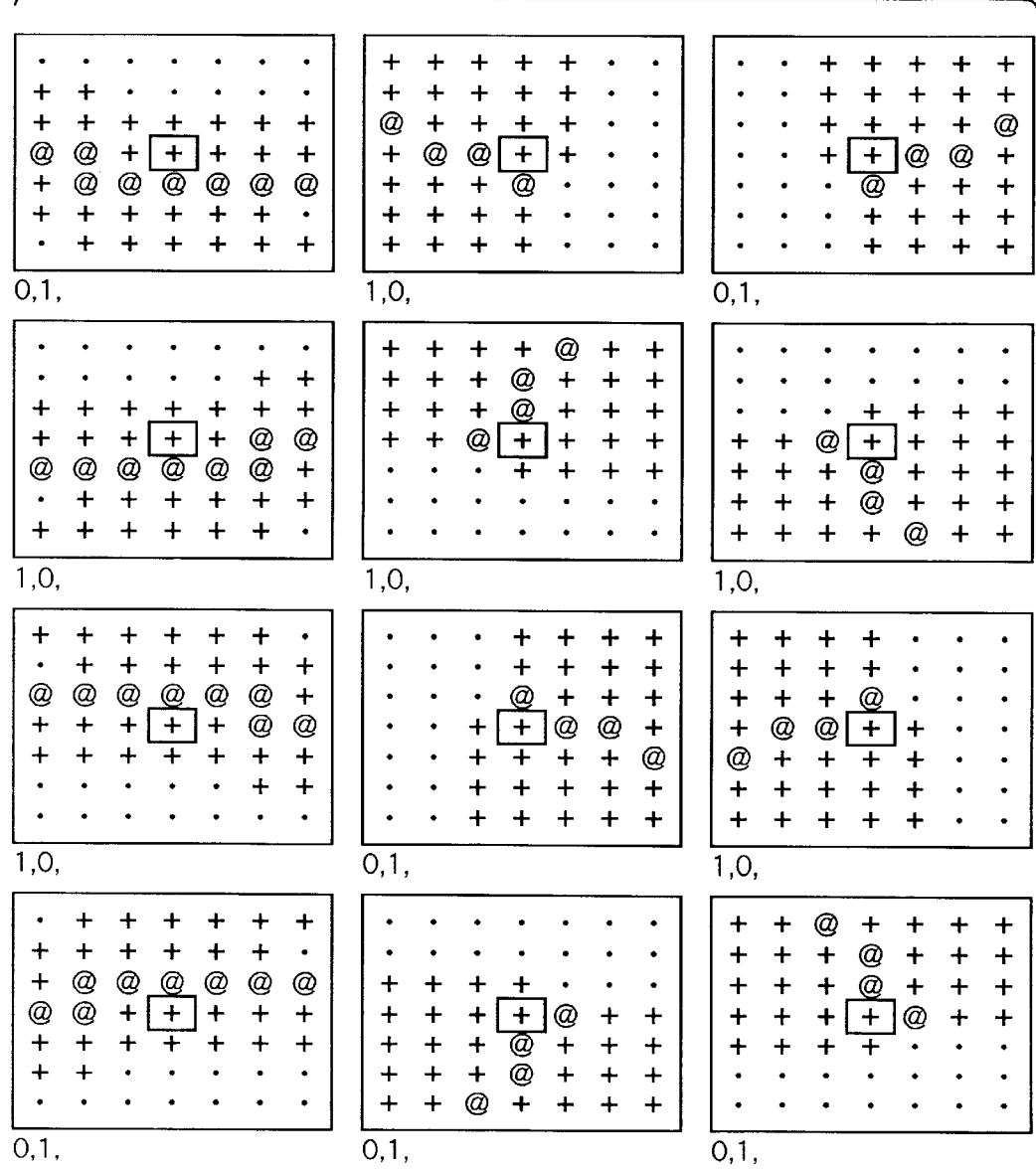
FIG. 13 is a diagram illustrating a list of patterns used at the time of both a printing operation and copying operation according to the fourth embodiment.
Figure 14:
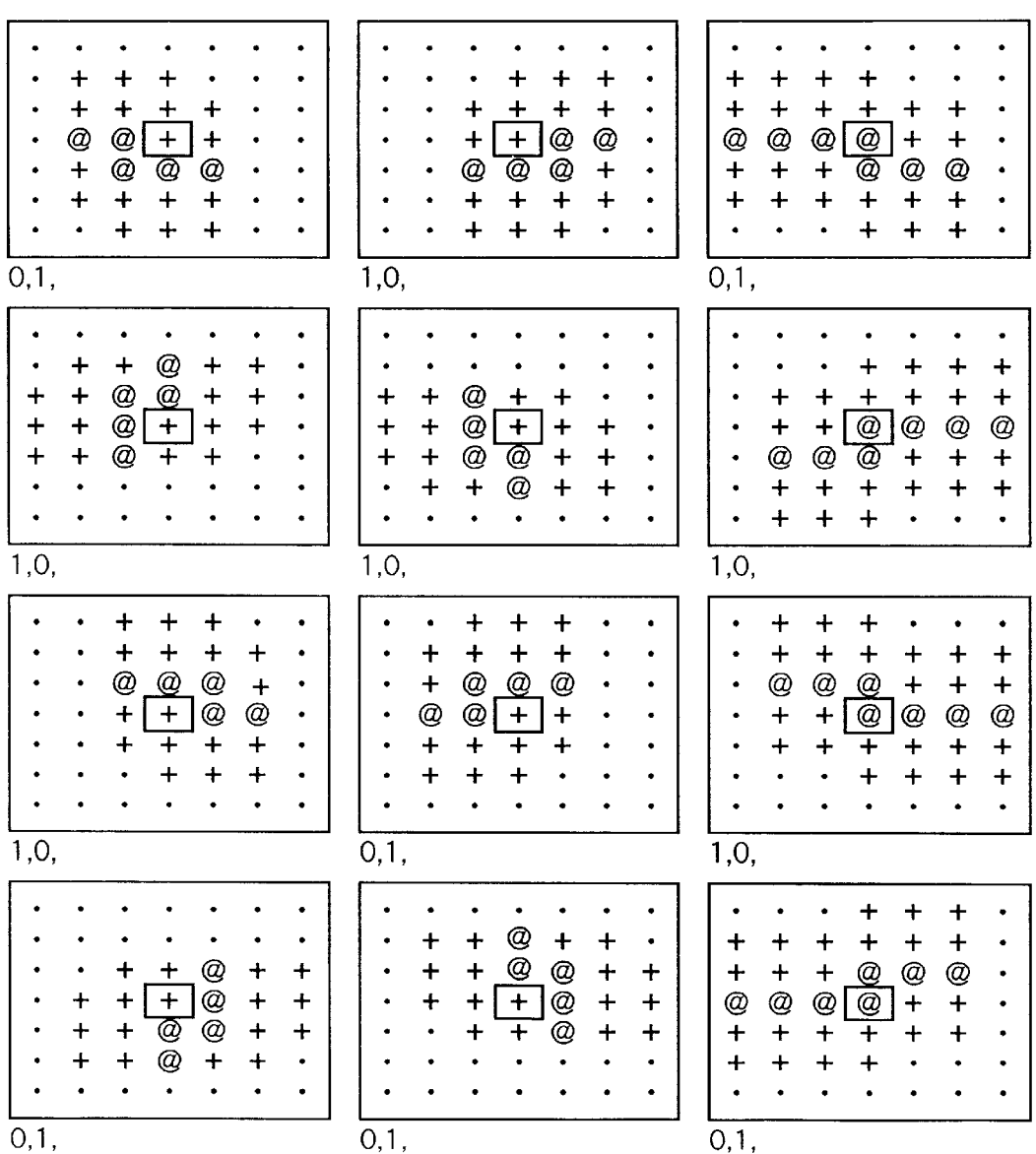
FIG. 14 is a diagram illustrating a list of patterns used at the time of both a printing operation and copying operation according to the fourth embodiment.
Figure 15:
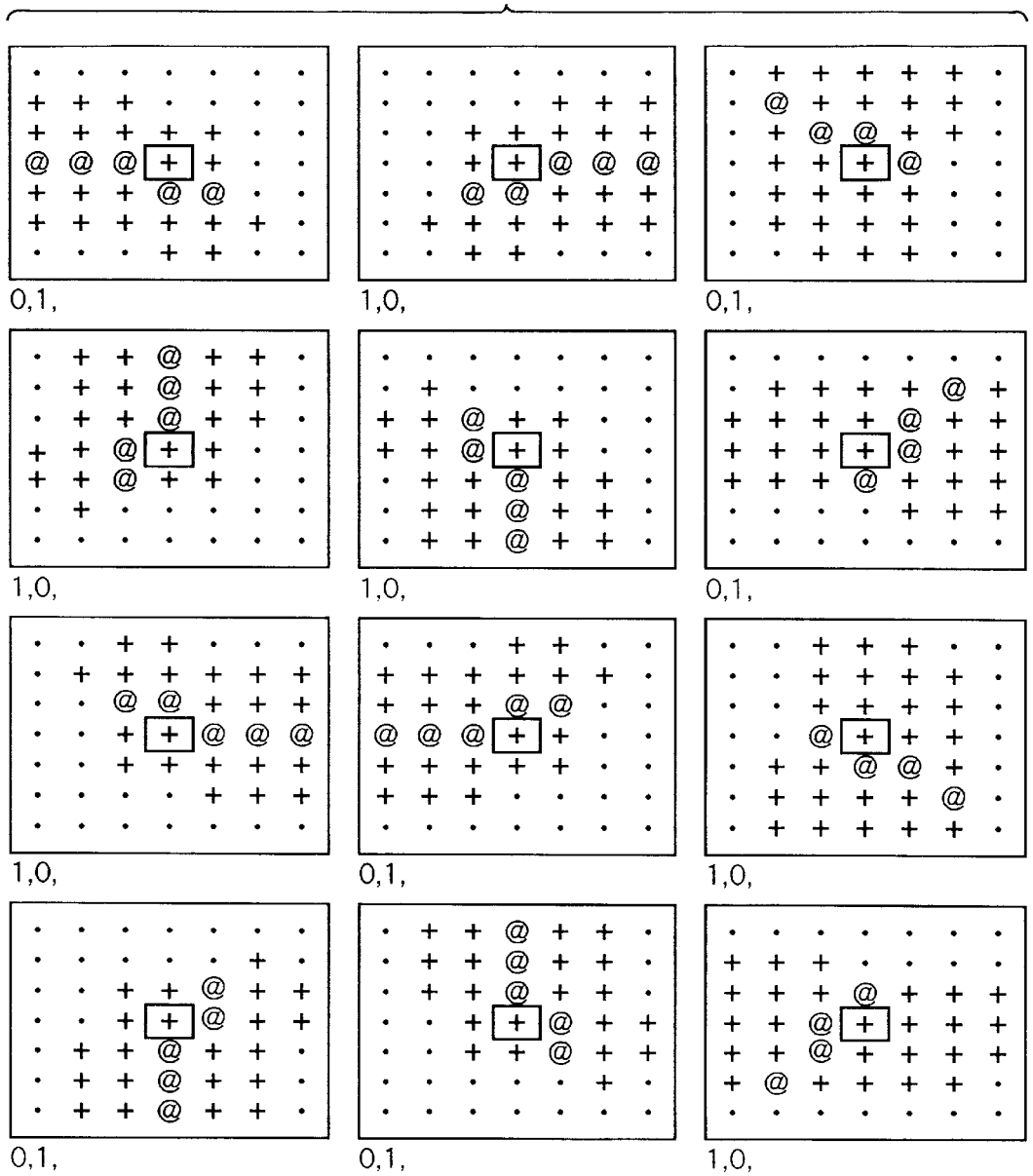
FIG. 15 is a diagram illustrating a list of patterns used at the time of both a printing operation and copying operation according to the fourth embodiment.
Figure 18:
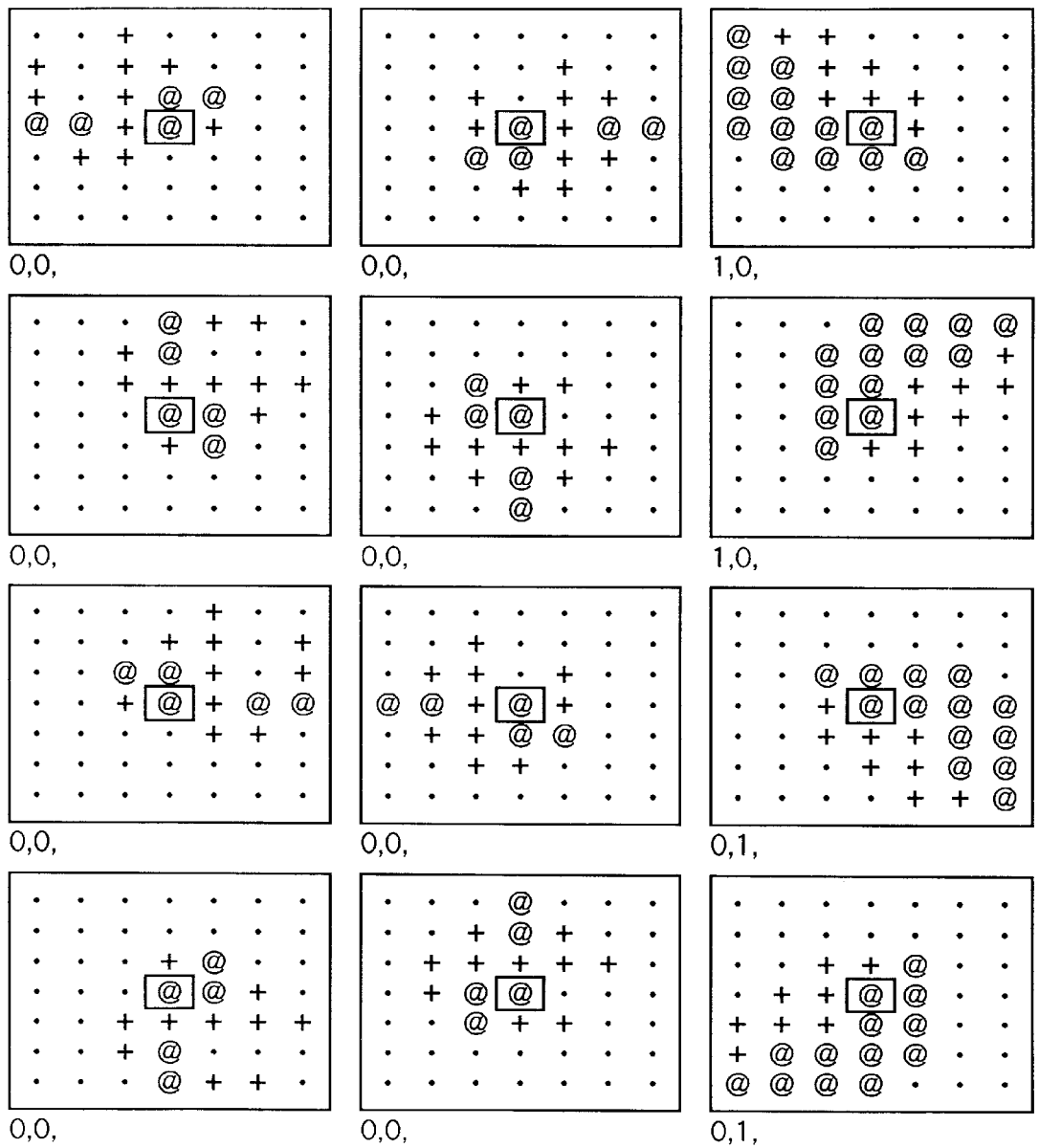
FIG. 18 is a diagram illustrating a list of patterns used at the time of a copying operation only according to the fourth embodiment.
Figure 19:
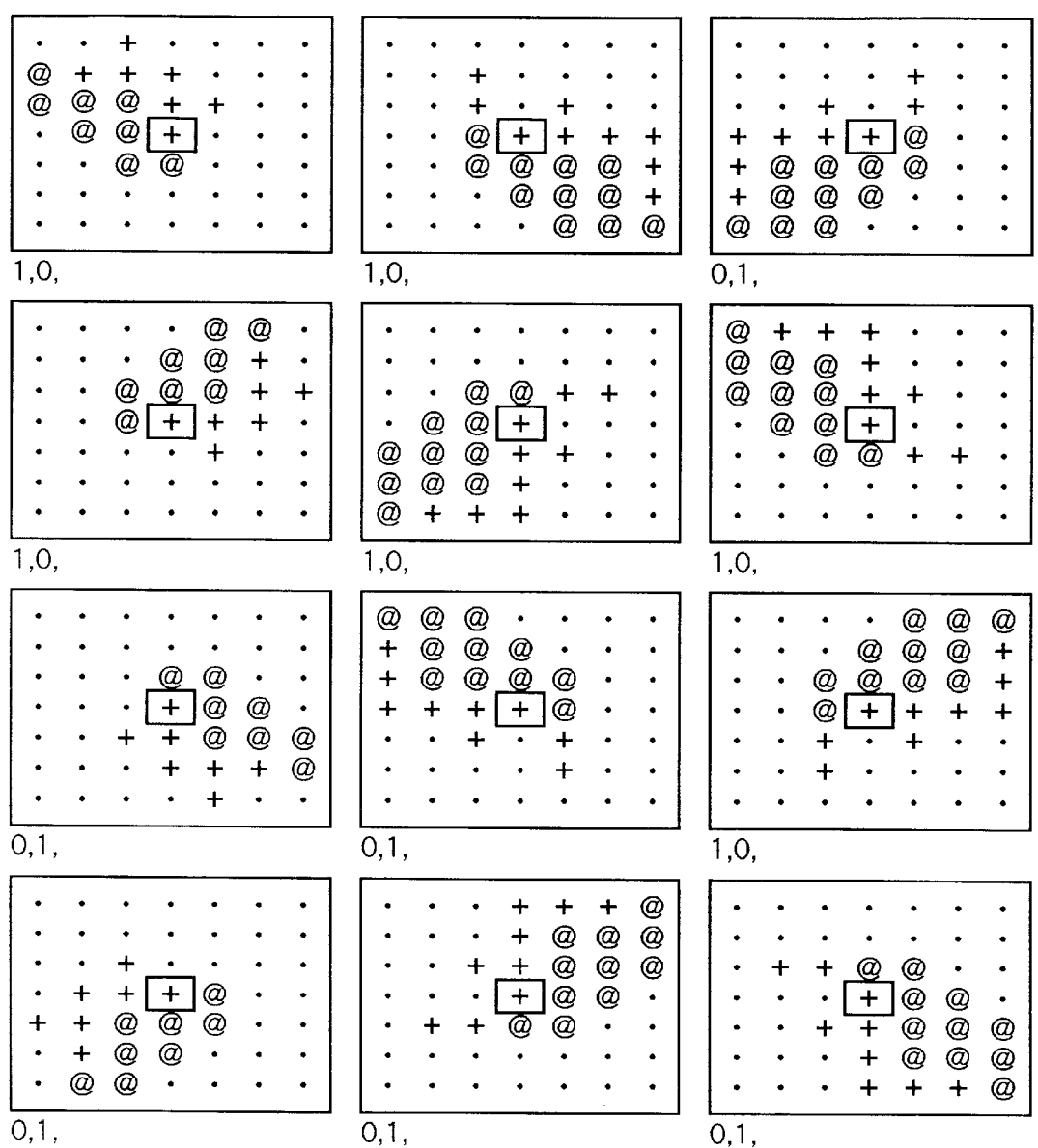
FIG. 19 is a diagram illustrating a list of patterns used at the time of a copying operation only according to the fourth embodiment.
Figure 20:
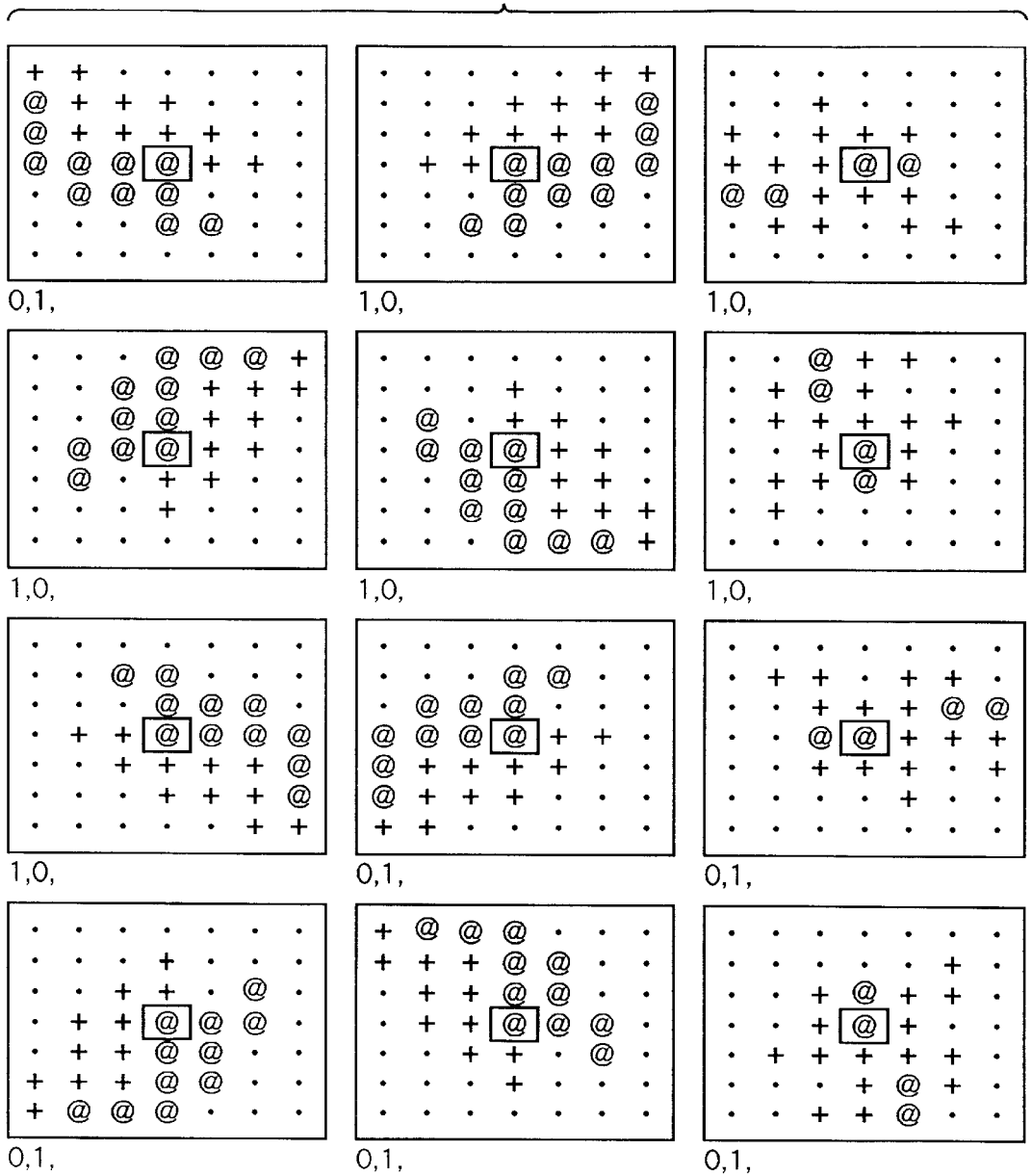
FIG. 20 is a diagram illustrating a list of patterns used at the time of a copying operation only according to the fourth embodiment.
Figure 21:
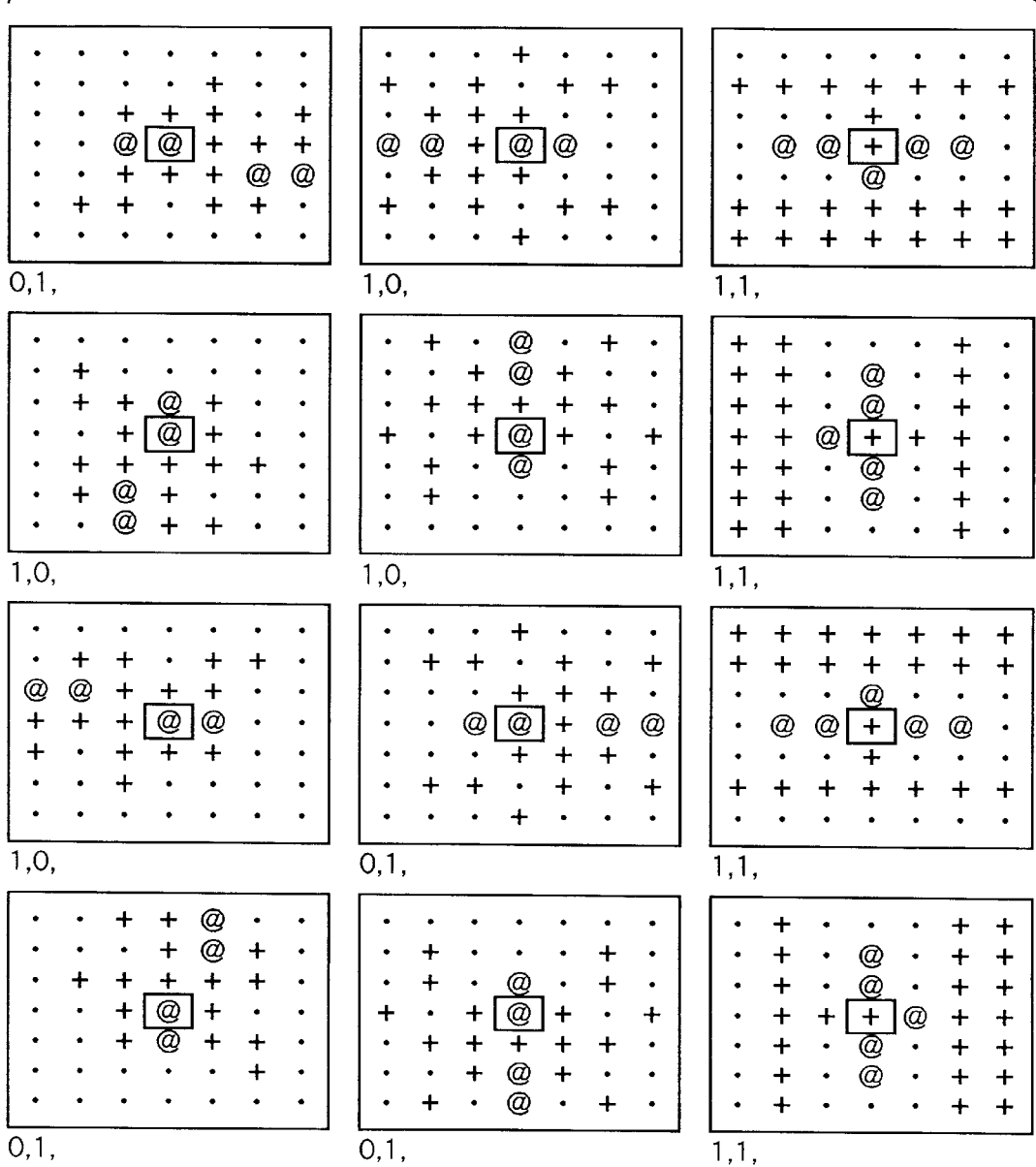
FIG. 21 is a diagram illustrating a list of patterns used at the time of a copying operation only according to the fourth embodiment.
Figure 22:
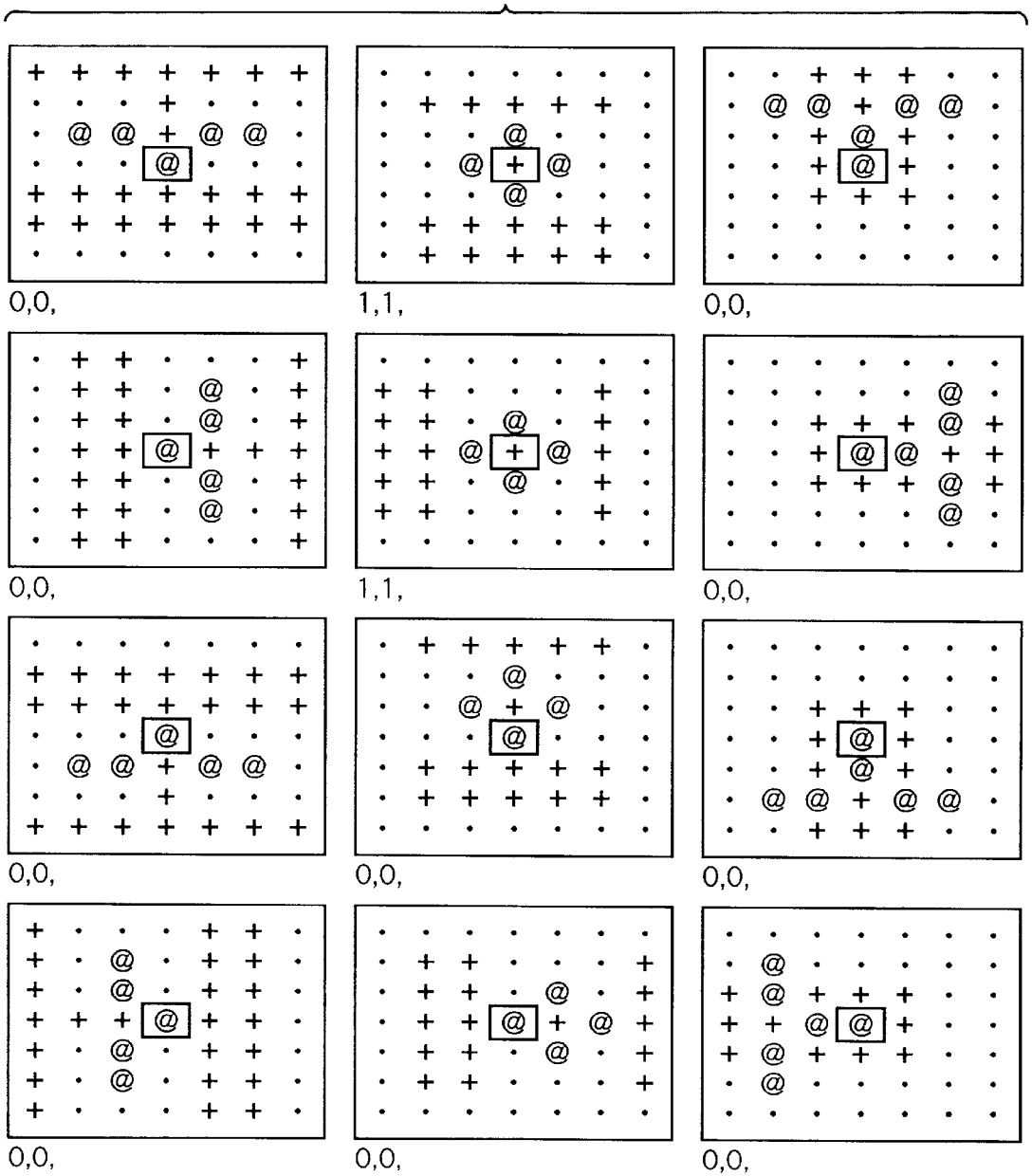
FIG. 22 is a diagram illustrating a list of patterns used at the time of a copying operation only according to the fourth embodiment.
Figure 23:
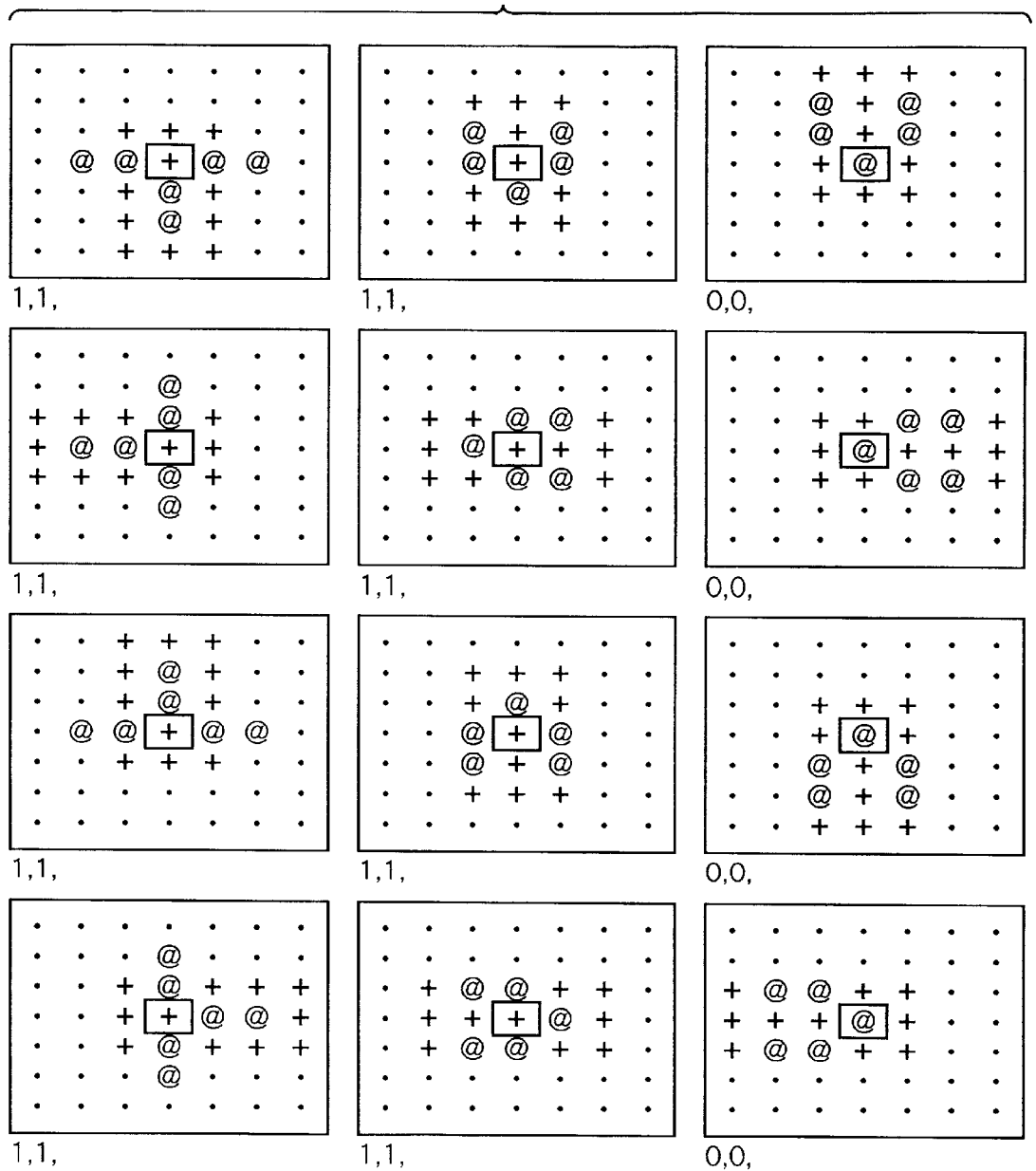
FIG. 23 is a diagram illustrating a list of patterns used at the time of a copying operation only according to the fourth embodiment.
Figure 24:
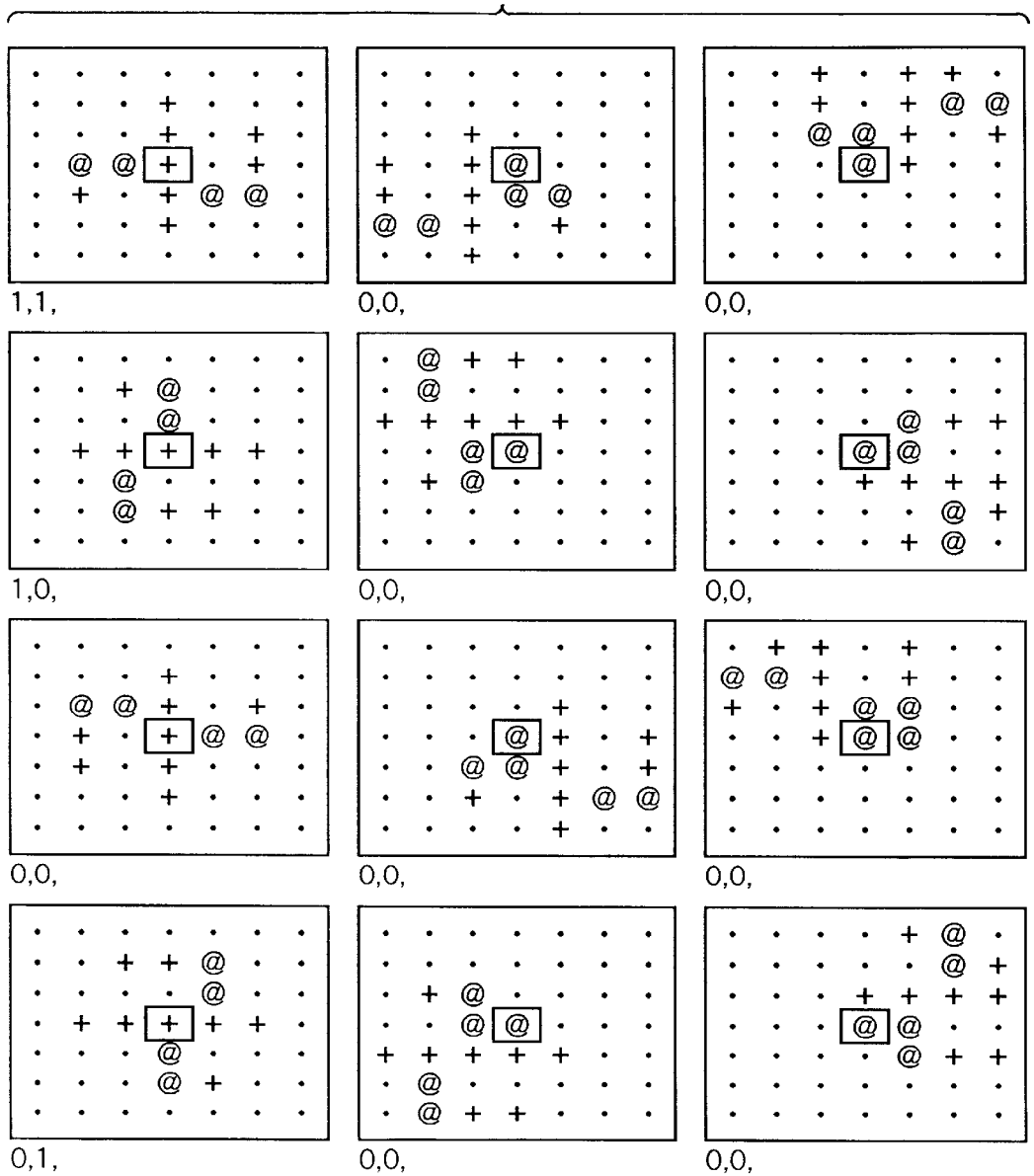
FIG. 24 is a diagram illustrating a list of patterns used at the time of a copying operation only according to the fourth embodiment.

FIG. 9 is a conceptual view of a mask register according to the fourth embodiment. There are N-number of patterns. The values of ith and jth patterns in the mask register are "0" and the values of other patterns are "1". The fourth embodiment will be described assuming that "1" is an enabling signal and "0" a disabling signal.

In a case where the ith or jth pattern has arrived, the value in the mask register will by "0" and, hence, the binarized signal is output as is. In this case, in consideration of the fact that the output image signal has a resolution higher, in at least one direction, than that of the input image signal, a plurality of signals, each of which has the same area as that of the input image signal, are output at the same position. If another pattern has arrived, the pixel substitution processor 106 goes to the ROM 105 to read out the pixel substitution pattern that corresponds to the pattern for which matching was achieved and outputs this pattern to the image signal output unit 107.

Other components in the fourth embodiment having the above-mentioned functions are the same as those of the first embodiment illustrated in FIGS. 1 and 2 and need not be described again.

Examples of patterns used in the fourth embodiment are illustrated in FIGS. 10 through 24. In each of FIGS. 10 through 24,. reference patterns of 7×7 pixels and substitution pixel signals corresponding to these patterns are indicated by the two numerals, which are separated by commas, shown below the patterns. The reference patterns are numbered consecutively from top to bottom on the left, from top to bottom in the middle and from top to bottom on the right in each Figure. The symbols representing the pixels of the numbered reference patterns in each Figure have the following meanings:

"." signifies a pixel that has no effect upon matching, regardless of whether the pixel is black or white;

"+" signifies a white pixel; and

"@" signifies a black pixel.

Figure 25:
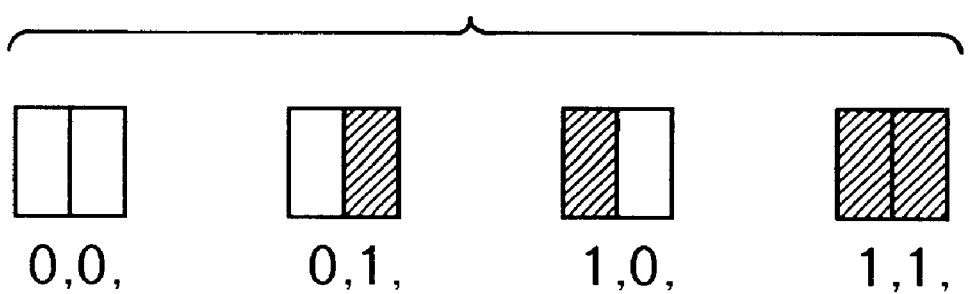
FIG. 25 is a diagram useful in describing substitution pixels in the fourth embodiment.

An example of corresponding substitution pixel signals is illustrated in FIG. 25. Here (0,0) indicates a case in which 600×300-dpi left and right pixels obtained by splitting a single pixel in half vertically (i.e., into left and right pixels) are both white pixels; (0,1) indicates a case in which 600×300-dpi left and right pixels obtained by splitting a single pixel in half vertically are white and black pixels, respectively; (1,0) indicates a case in which 600×300-dpi left and right pixels obtained by splitting a single pixel in half vertically are black and white pixels, respectively; and (1,1) indicates a case in which 600×300-dpi left and right pixels obtained by splitting a single pixel in half vertically are both black pixels.

Among the patterns shown in FIGS. 10 through 24, those illustrated in FIGS. 10 through 17 are patterns used at the time of both a printing operation and copying operation. FIGS. 10, 11, 12, 13, 14, 15, 16 and 17 illustrate 0th to 11th masks, 12th to 23rd masks, 24th to 35th masks, 36th to 47th masks, 48th to 59th masks, 60th to 71th masks, 72nd to 83rd masks and 84th to 95th masks, respectively.

FIGS. 18 through 24 are lists of patterns used at the time of a copying operation only. FIGS. 18, 19, 20, 21, 22, 23 and 24 illustrate 204th to 215th masks, 216th to 227th masks, 228th to 239th masks, 240th to 251st masks, 252nd to 263rd masks, 264th to 275th masks and 276th to 278th masks, respectively.

In the fourth embodiment, one mask register for use when printing is performed is provided and the values of numbers 0–95 are made "1" while the values of 96–288 are made "0". When copying is performed, the mask register is not used and all patterns are made valid. The 204th to 287th patterns shown in FIGS. 18 through 24 are patterns necessary in order to smoothly reproduce an image at the time of a copying operation. At the time of a printing operation, however, almost none of these patterns will provide a match or, even they do, the resulting image quality will be poor.

In the fourth embodiment, therefore, it is so arranged that when printing is performed, a substitution operation based upon the 204th to 287th patterns shown in FIGS. 18 through 24 is not carried out using the mask register. As a result, it is possible to smoothly reproduce an image conforming to a copying operation at the time of the copying operation and, moreover, smooth reproduction of an image by smoothing processing can be performed without degrading the image at the time of a printing operation.

The selection signal may effect the changeover between the printing and copying operations. It is also effective to make a changeover by mode selection, such as by selecting a character mode or photographic mode, for providing the optimum image output depending upon the type of document at the time of the copying operation. Though the fourth embodiment has been described taking a case in which there is only one mask register as an example, it goes without saying that a plurality of mask registers may be provided and switched among.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system or the like working on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

In a case where the present invention is applied to the above-mentioned storage medium, program codes corresponding to the above-described flowchart and patterns used in pattern matching are stored on the storage medium.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    input means for inputting a multilevel digital image signal;
    binarizing means for converting the multilevel digital image signal input from said input means to a bilevel image;
    pattern storage means for storing predetermined reference patterns and pixel substitution patterns corresponding to the reference patterns;
    pattern matching means for comparing the bilevel image and the reference patterns stored in said pattern storage means; and
    pixel substitution means which, if the result of the comparison performed by said pattern matching means indicates that the bilevel image matches a reference pattern, outputs a pixel substitution pattern, which corresponds to this reference pattern,
    wherein, the reference patterns are patterns for detecting a case where a line in the bilevel image has been rendered discontinuously by one or more pixels as a result of binarization performed by said binarizing means, and the pixel substitution pattern, which has been stored in said pattern storage means, that is output by said pixel substitution means, are pixel substitution patterns for rendering continuously the line in the bilevel image.

2. The apparatus according to claim 1, wherein if the result of the comparison performed by said pattern matching means indicates that there is no reference pattern that matches the bilevel image, said pixel substitution means outputs the bilevel image as is.

3. The apparatus according to claim 1, wherein said input means includes reading means for optically reading an image and outputting a multilevel digital image signal indicative of the image read.

4. The apparatus according to claim 1, wherein said pattern storage means stores, with respect to each reference pattern, pixel substitution patterns having a plurality of different pixels of interest.

5. The apparatus according to claim 4, wherein the reference patterns and the plurality of pixel substitution patterns corresponding to each reference pattern stored in said pattern storage means are so adapted that a sum total of signal values of an original pattern will not be changed even if a pixel substitution is performed.

6. The apparatus according to claim 4, wherein a plurality of reference patterns and the plurality of pixel substitution patterns corresponding to these reference patterns stored in said pattern storage means are so adapted as to preserve, at the time an output is produced, the density of an original image even if a pixel substitution is performed.

7. The apparatus according to claim 1, wherein said pattern storage means stores, with respect to each reference pattern, a pixel substitution pattern having one pixel of interest.

8. The apparatus according to claim 7, wherein a plurality of reference patterns corresponding to a predetermined pattern of an original image and pixel substitution patterns corresponding to respective ones of the plurality of reference patterns stored in said pattern storage means are so adapted that a sum total of signal values of the original pattern will not be changed even if a pixel substitution is performed.

9. The apparatus according to claim 7, wherein a plurality of reference patterns and pixel substitution patterns corresponding to respective ones of the plurality of reference patterns stored in said pattern storage means are so adapted as to preserve, at the time an output is produced, the density of an original image even if a pixel substitution is performed.

10. The apparatus according to claim 7, wherein among a plurality of reference patterns stored in said pattern storage means, reference patterns that delete an image owing to pixel substitution are larger in number than reference patterns that add on an image owing to pixel substitution.

11. The apparatus according to claim 1, wherein said pattern matching means is capable of performing control in such a manner that a specific reference pattern stored in said pattern storage means will not be read out.

12. The apparatus according to claim 1, wherein said binarizing means includes pseudo-halftone processing means for converting a multilevel image to a bilevel image using pseudo-halftone processing.

13. The apparatus according to claim 1, wherein said pixel substitution means includes substitution enabling signal storage means for storing a substitution enabling signal that corresponds to each pixel substitution pattern stored in said pattern storage means, said pixel substitution means executing pixel substitution processing if pixel substitution is enabled and halting pixel substitution processing if pixel substitution is disabled.

14. An image processing method for inputting a multilevel digital image signal, converting the input multilevel digital image signal to a bilevel image and outputting the bilevel image, comprising the steps of:

provinding predetermined reference patterns and pixel substitution patterns corresponding to these reference patterns;

comparing the bilevel image and the reference patterns; and if the result of the comparison indicates that the bilevel image matches a reference pattern, outputting a pixel substitution pattern, which corresponds to this reference pattern, wherein, the reference patterns are patterns for detecting a case where a line in the bilevel image has been rendered discontinuously by one or more pixels as a result of binarization of the image, and the pixel substitution patterns are pixel substitution patterns for rendering continuously the line in the bilevel image.

15. The method according to claim 14, further comprising a step of outputting the bilevel signal as is if the result of the comparison indicates that there is no reference pattern that matches the bilevel image.

16. The method according to claim 14, wherein the input multilevel digital image signal is obtained from reading means for optically reading an image and outputting a multilevel digital image signal indicative of the image read.

17. The method according to claim 14, wherein pixel substitution patterns having a plurality of different pixels of interest are provided with respect to each reference pattern.

18. The method according to claim 17, wherein the reference patterns and the plurality of pixel substitution patterns corresponding to each reference pattern provided are so adapted that a sum total of signal values of an original pattern will not be changed even if a pixel substitution is performed.

19. The method according to claim 17, wherein a plurality of reference patterns and the plurality of pixel substitution patterns corresponding to these reference patterns provided are so adapted as to preserve, at the time an output is produced, the density of an original image even if a pixel substitution is performed.

20. The method according to claim 14, wherein a pixel substitution pattern having one pixel of interest is stored with respect to each reference pattern.

21. The method according to claim 20, wherein a plurality of reference patterns corresponding to a predetermined pattern of an original image and pixel substitution patterns corresponding to respective ones of the plurality of reference patterns provided are so adapted that a sum total of signal values of the original pattern will not be changed even if a pixel substitution is performed.

22. The method according to claim 20, wherein a plurality of reference patterns and pixel substitution patterns corresponding to respective ones of the plurality of reference patterns provided are so adapted as to preserve, at the time an output is produced, the density of an original image even if a pixel substitution is performed.

23. The method according to claim 20, wherein among a plurality of reference patterns provided, reference patterns that delete an image owing to pixel substitution are larger in number than reference patterns that add on an image owing to pixel substitution.

24. The method according to claim 14, wherein it is possible to perform control in pattern matching in such a manner that a specific reference pattern will not be used.

25. The method according to claim 14, wherein conversion to the bilevel image includes pseudo-halftone processing for converting a multilevel image to a bilevel image using pseudo-halftone processing.

26. The method according to claim 14, wherein substitution enabling signals are provided to correspond to pixel substitution patterns, pixel substitution processing is executed if pixel substitution is enabled and pixel substitution processing is halted if pixel substitution is disabled.

27. A storage medium for storing, so as to be readable by a computer, an image processing program for inputting a multilevel digital image signal, converting the input multilevel digital image signal to a bilevel image and outputting the bilevel image, said image processing program including the following modules in a case where predetermined reference patterns and pixel substitution patterns corresponding to these reference patterns have been provided:

a module for comparing the bilevel image and the reference patterns; and a module which, if the result of the comparison indicates that the bilevel image matches a reference pattern, is for outputting a pixel substitution pattern, which corresponds to this reference pattern, wherein, the reference patterns are patterns for detecting a case where a line in the bilevel image has been rendered discontinuously by one or more pixels as a result of binarization of the image, and the pixel substitution patterns are pixel substitution patterns for rendering continuously the line in the bilevel image.

28. The storage medium according to claim 27, wherein it is possible to perform control in pattern matching in such a manner that a specific reference pattern will not be used.

29. The storage medium according to claim 27, wherein substitution enabling signals are provided to correspond to the pixel substitution patterns, pixel substitution processing is executed if pixel substitution is enabled and pixel substitution processing is halted if pixel substitution is disabled.

30. The storage medium according to claim 27, further including predetermined reference patterns and pixel substitution patterns corresponding to these reference patterns.

31. The storage medium according to claim 29, further including substitution enabling signals corresponding to the pixel substitution patterns.

* * * * *

UNITED STATES PATENT AND TRADEMARK OFFICE
CERTIFICATE OF CORRECTION

PATENT NO.    : 6,333,998 B1
DATED         : December 25, 2001
INVENTOR(S)   : Matsumoto It is certified that error appears in the above-identified patent and that said Letters Patent is hereby corrected as shown below:

Column 5,
Line 65, "even" should read -- , wherein --.

Column 6,
Line 19, "on" (first occurrence) should read -- are --.

Column 7,
Line 1, "as" should be deleted.

Column 13,
Line 56, "by" should read -- be --.

Column 14,
Line 7, "24,." should read -- 24, --.

Signed and Sealed this

Ninth Day of July, 2002

*Attest:*

*Attesting Officer*

JAMES E. ROGAN
*Director of the United States Patent and Trademark Office*